(12) United States Patent
Higashino et al.

(10) Patent No.: US 7,551,668 B2
(45) Date of Patent: Jun. 23, 2009

(54) ADAPTIVE EQUALIZING APPARATUS AND METHOD

(75) Inventors: Satoru Higashino, Tokyo (JP); Yoshiyuki Kajiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 11/084,786

(22) Filed: Mar. 21, 2005

(65) Prior Publication Data
US 2005/0226316 A1 Oct. 13, 2005

(30) Foreign Application Priority Data
Apr. 9, 2004 (JP) ............................. 2004-115769

(51) Int. Cl.
*H03H 7/30* (2006.01)
(52) U.S. Cl. .................. 375/232; 375/230; 375/233
(58) Field of Classification Search ............. 375/232, 375/230, 233
See application file for complete search history.

(56) References Cited

U.S. PATENT DOCUMENTS

| | | | | |
|---|---|---|---|---|
| 3,714,402 | A * | 1/1973 | Baumwolspiner | 708/320 |
| 5,136,593 | A * | 8/1992 | Moon et al. | 714/796 |
| 5,424,882 | A * | 6/1995 | Kazawa | 360/46 |
| 5,744,993 | A * | 4/1998 | Sonntag | 327/307 |
| 5,748,674 | A * | 5/1998 | Lim | 375/233 |
| 5,809,080 | A * | 9/1998 | Karabed et al. | 375/263 |
| 5,822,143 | A * | 10/1998 | Cloke et al. | 360/65 |
| 5,966,262 | A * | 10/1999 | Brickner et al. | 360/65 |
| 6,012,161 | A * | 1/2000 | Ariyavisitakul et al. | 714/795 |
| 6,219,387 | B1 * | 4/2001 | Glover | 375/341 |
| 6,307,884 | B1 * | 10/2001 | Du et al. | 375/233 |
| 6,314,135 | B1 * | 11/2001 | Schneider et al. | 375/232 |
| 6,570,919 | B1 * | 5/2003 | Lee | 375/233 |
| 6,690,723 | B1 * | 2/2004 | Gosse et al. | 375/233 |
| 6,754,294 | B1 * | 6/2004 | Adireddy et al. | 375/348 |
| 7,012,957 | B2 * | 3/2006 | Allpress et al. | 375/233 |

(Continued)

FOREIGN PATENT DOCUMENTS

JP 2000-151425 5/2000

OTHER PUBLICATIONS

Ryan, "Performance of Adaptive Volterra Equalizers on Nonlinear Magnetic Recording Channels," IEEE Transactions on Magnetics, vol. 31, No. 6, pp. 3054-3056 Nov. 1995.*

(Continued)

*Primary Examiner*—Juan A Torres
(74) *Attorney, Agent, or Firm*—Oblon, Spivak, McClelland, Maier & Neustadt, P.C.

(57) ABSTRACT

An adaptive equalizing apparatus that can positively remove the leading Inter Symbol Interference (ISI), make a maximum-likelihood decoding and an optimum equalization on the basis of the result of the maximum-likelihood decoding with consideration being given to the asymmetry of an input waveform. The adaptive equalizing apparatus includes a feedforward filter, a maximum-likelihood decoder, a feedback filter, a delay unit, and a subtracter. In the feedback filter, the tap factor is controlled on the basis of the binary signal generated by the maximum-likelihood decoding to generate a distortion of a partial response after the leading edge of the binary signal and an ISI response after the trailing edge. In the feedforward filter, the tap factor for the signal supplied from the subtracter is controlled to be a partial response.

10 Claims, 25 Drawing Sheets

U.S. PATENT DOCUMENTS

| | | | |
|---|---|---|---|
| 7,088,770 B2* | 8/2006 | Tripathi et al. | 375/233 |
| 2002/0012306 A1* | 1/2002 | Hayami et al. | 369/59.21 |
| 2002/0150155 A1* | 10/2002 | Florentin et al. | 375/233 |
| 2002/0184597 A1* | 12/2002 | Jeon et al. | 714/795 |
| 2003/0161258 A1* | 8/2003 | Zhang et al. | 370/203 |
| 2004/0037373 A1* | 2/2004 | Ashley et al. | 375/341 |
| 2004/0120394 A1* | 6/2004 | Miao et al. | 375/234 |
| 2004/0252753 A1* | 12/2004 | Li et al. | 375/141 |
| 2005/0025229 A1* | 2/2005 | Jones et al. | 375/232 |
| 2005/0254570 A1* | 11/2005 | Amizic et al. | 375/233 |
| 2005/0289204 A1* | 12/2005 | Tellado et al. | 708/300 |
| 2006/0239342 A1* | 10/2006 | Amizic et al. | 375/233 |

OTHER PUBLICATIONS

Hermann, "Volterra Modeling of Digital Magnetic Saturation Recording Channels," IEEE Transactions on Magnetics, vol. 26, No. 5 Sep. 1990, pp. 2125-2127.*

Naoki, "Adaptive Partial-Response Maximum-Likelihood Detection in Optical Recording Media", Jpn. J. Appl. Phys. vol. 41 (2002) pp. 1789-1790 Part 1, No. 3B, Mar. 2002 (c) 2002 The Japan Society of Applied Physics.*

V. John Mathews, "Adaptive Polynomial Filters", IEEE Signal Processing Magazine, vol. 8, Jul. 1991, pp. 10-26, 1 Cover sheet.

* cited by examiner

ADAPTIVE EQUALIZING APPARATUS AND METHOD

CROSS REFERENCES TO RELATED APPLICATIONS

The present invention contains subject matter related to Japanese Patent Application JP 2004-115769 filed in the Japanese Patent Office on Apr. 9, 2004, the entire contents of which being incorporated herein by reference.

BACKGROUND OF THE INVENTION

1. Field of the Invention

The present invention relates to an adaptive equalizing apparatus and method, used in an optical or magnetic recorder to make waveform equalization with a PRML (partial response maximum-likelihood) technique which is a combination of the partial response equalization and the maximum-likelihood decoding such as the Viterbi decoding, FDTS (fixed delay tree search) or the like.

2. Description of the Related Art

In a recorder using a superdense recording type optical disk such as the recently developed blue-ray disk (brand name), the playback system thereof is regarded as a transversal filter to make waveform equalization by the PRML technique which is a combination of the partial-response equalization (will be referred to as "PR equalization" hereunder) utilizing an inter-symbol interference which will take place in the transversal filter, and the maximum-likelihood binarization such as the Viterbi decoding, FDTS (fixed delay tree search), etc. which can prevent any random noise-caused degradation of the signal-to-noise ratio (S/N ratio).

Also, there is well known an adaptive Viterbi decoding capable of decoding, with a high performance, even an input waveform including an nonlinearity such as an asymmetry or the like (as in the Japanese Patent Application Laid Open No. 261273 of 1998, which will be referred to as "patent document No. 1) and Naoki Ide, "Adaptive Partial-Response Maximum-Likelihood Detection in Optical Recording Media" ISOM2002).

Also, to equalize and decode a read signal, it is well known to make nonlinear equalization of an input waveform itself by a nonlinear model and then decode the read signal at a downstream stage.

If a signal supplied to a general linear adaptive equalizer includes a nonlinear component such as a vertical asymmetry in the amplitude thereof, it is theoretically difficult to make any Wiener-optimal adaptive equalization of the input signal and a nonlinear equalization error will remain in a waveform output from the linear adaptive equalizer. It is known that in case it can be presumed that the nonlinear component can be expanded into a Volterra series by an ideal linear signal, approximate adaptive equalization can be made of the nonlinear equalization error by a adaptive equalization Volterra filter whose nonlinear equalization error has an order corresponding to the magnitude of an order of the nonlinearity of the nonlinear equalization error (as in Mathews, V. J., "Adaptive Polynomial Filters" IEEE Signal Processing Magazine, Volume 8, Issue 3, July 1991, pp. 10-26).

It has been pointed out that especially in optical recording, signals to be recorded include a nonlinear component and various signal processing techniques have been researched for improvement of characteristics. In the signal processing method disclosed in the Japanese Patent Application Laid Open No. 2001-525101, nonlinear components are removed by an adaptive equalization Volterra filter from a read signal from an optical disk, then the waveform signal resulted from the removal of nonlinear distortion is supplied to a Viterbi decoder, and an improved error-rate is implemented while reducing the scale of calculation through contrivance of the detector design.

OBJECT AND SUMMARY OF THE INVENTION

However, in case PR equalization is made of an input waveform including insufficient or no frequency components required for the PR equalization, there will occur a frequency domain which cannot be equalized by any means. Such an error will remain as an equalization error greatly depending upon a pattern of input data, degrade the decoder performance to a large extent and lead to degradation of a bit error rate (BER).

Also in waveform equalization by the PRML technique, ISI (inter-symbol interference) included before the leading edge of a signal waveform to be equalized (will be referred to as "leading edge ISI" hereunder), that is, an interference waveform included before the rising edge, has to be removed by a PR equalization filter. Namely, since any future data the digital signal processing is based on cannot be predicted, a waveform distortion due to the leading edge ISI cannot be removed with the Viterbi decoding and FDTS.

Also, in the high-dense optical recorder represented by the blue-ray disc having recently been put into practical use, a distortion of nonlinear signal components, such as the vertical asymmetry, of a read signal has become to have a non-negligible influence on the operation of the adaptive equalizer.

Here will be explained, by way of example, PR equalization of a signal including asymmetry by a conventional linear adaptive equalizer for an arbitrary target. For example, in case an LMS algorithm which is a typical adaptive equalization algorithm is used, an input signal will include a vertical asymmetry although a provisional decision as a target of the adaptive equalization is a vertically symmetrical linear data series. In this case, the LMS algorithm will possibly run to minimize an MSE (mean square error) as the difference between the provisional decision and adaptive equalizer output according to only the mathematical nature thereof, and accordingly output a signal having a large difference from a target of the PR equalization, normally intended by the adaptive equalizer.

Also, a detector for data which various effective techniques of processing have been researched and implemented is intended for being supplied with a linear signal. If supplied with a signal including still a nonlinear equalization error, the detector has a difficulty to work best. Also it is well known that in case a signal still including a nonlinear equalization error, among others, is supplied to a maximum-likelihood decoder represented by the Viterbi decoder intended for various types of PR equalization, a mean value of various detected signal amplitudes will be difference from the amplitude of an input ideal linear signal which is normally ideal, which will cause an error in the likelihood calculation and have an adverse effect on the result of decision.

On the other hand, in case a signal including a vertical asymmetry is to be supplied to a maximum-likelihood decoder for adaptive equalization, the latter should be an adaptive Viterbi decoder which can vary the reference amplitude level of the detector adaptively as proposed in the aforementioned patent document No. 1 to improve the performance of decoding can be improved to some extent. In this case, however, since the upper and lower signal amplitude levels are different in absolute value from each other, quantization bit width cannot evenly be allocated to implement a circuit. It is well known that the quantization error cannot be disregarded and the maximum-likelihood decoder cannot work well unless the circuit is designed to have a larger quantization bit width than a necessary and sufficient one for a decoder optimized for an input signal which is normally linear.

To overcome the above-mentioned drawbacks of the related art, it is desirable to provide an adaptive equalizing apparatus and method, in which the PR equalization and maximum-likelihood decoding are adopted in combination, leading edge ISI can be removed positively and an input waveform can optimally be equalized using the maximum-likelihood decoding and result of the decoding with consideration given to the asymmetry of the input waveform.

The above object can be attained by providing an adaptive equalizing apparatus which makes partial response equalization and maximum-likelihood decoding of a read signal from a recording or transmission medium to generate a binary signal, the apparatus including according to the present invention:

a feedforward filter to filter the read signal;

a forward filter controlling means for controlling the tap factor of the feedforward filter;

a maximum-likelihood decoding means for making maximum-likelihood decoding of the signal filtered by the feedforward filter to generate the binary signal;

a feedback filter to filter the binary signal supplied from the maximum-likelihood decoding means;

a feedback filter controlling means for controlling the tap factor of the feedback filter;

a delaying means for delaying the signal filtered by the feedforward filter by a processing time of the maximum-likelihood decoding means; and a subtracting means for subtracting the signal supplied from the feedback filter from the signal supplied from the delaying means, the feedback filter controlling means controlling the tap factor on the basis of the binary signal generated by the maximum-likelihood decoding to generate a distortion of a partial response after the leading edge of the binary signal and an ISI (inter-symbol interference) response after the trailing edge;

the feedforward filter controlling means controlling the tap factor for the signal supplied from the subtracting means to be a partial response; and the feedforward filter being a nonlinear filter.

Also the above object can be attained by providing an adaptive equalizing method of generating a binary signal by making partial response equalization and maximum-likelihood decoding of a read signal from a recording or transmission medium, the method including, according to the present invention, the steps of:

generating, based on the result of a previous equalization, a distortion of a partial response after the leading edge of the binary signal and an ISI (inter-symbol interference) response after the trailing edge;

filtering the read signal by a nonlinear filter whose tap factor has been adjusted to a response characteristic which will be a partial response when the distortion of the partial response after the leading edge of the binary signal and ISI response after the trailing edge are added together; and making maximum-likelihood decoding of the signal filtered by the nonlinear filter to generate the binary signal.

In the above adaptive equalizing apparatus and method according to the present invention, the feedforward filter is provided before the maximum-likelihood decoding means, the distortion of the partial response after the leading edge and ISI (inter-symbol interference) response after the trailing edge are generated based on the binary signal generated by making the maximum-likelihood decoding of the read signal, the distortion and trailing-edge ISI response are subtracted from the output from the feedforward filter, and the tap factor of the feedforward filter is controlled for the subtraction signal to be the partial response. Further, the feedforward filter is a nonlinear filter such as a high-order adaptive equalization Volterra filter, for example.

Thus, the adaptive equalizing apparatus and method according to the present invention can make decoding which is lower in error rate by making adaptive equalization with only a first part of ISI being taken as the partial response and its distortion and with subsequent trailing edge ISI not taken in consideration and compensating a missing frequency part of an input waveform.

Also, since the high-order adaptive equalization Volterra filter is used as the feedforward filter is used to remove a nonlinear distortion to thereby linearize the output approximately, the adaptive equalizing apparatus and method according to the present invention can enable a downstream signal processor to work with a performance as high as that with which the signal processor can process a linear signal.

Also, in the adaptive equalizing apparatus and method according to the present invention, since the feedback filter is used to generate, based on the binary signal generated by the maximum-likelihood decoding, the distortion of the partial response after the leading edge and ISI response after the trailing edge, the result of PR distortion and ISI response is utilized to detect an error so that the result of error detection will be less influenced by the distortion and ISI. Also, in case the binary signal generated by the maximum-likelihood decoding is used for the calculation in the error detection, if the binary signal is high in error rate, the adaptive equalizer will provide an output including many incorrect results of error detection. However, using the binary signal supplied from the adaptive equalizer according to the present invention for the calculation in the error detection, the adaptive equalizer will be able to provide an output less influence by the distortion and ISI and including correct results of error detection.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail below concerning the adaptive equalizer as an embodiment thereof.

Figure 1:
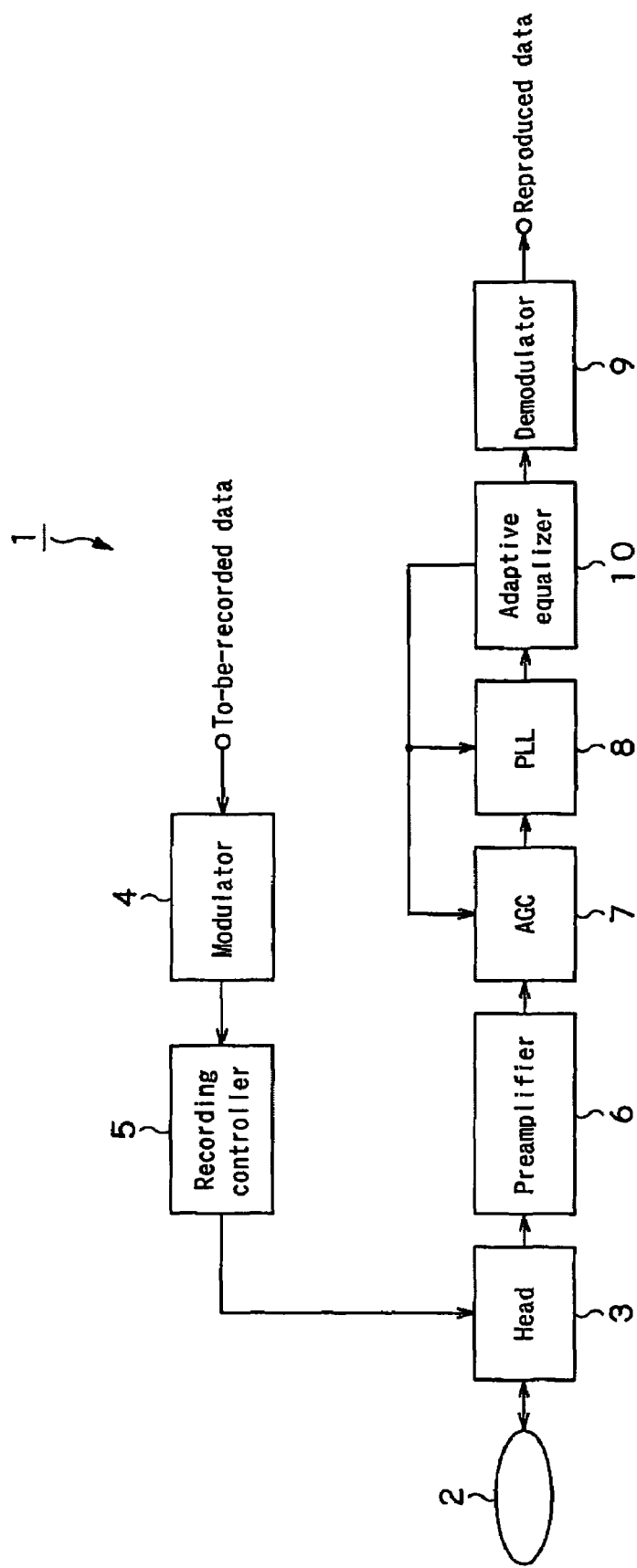
FIG. 1 is a block diagram showing the basic configuration of a recorder/player for an optical or magnetic disk, according to the present invention.

Referring now to FIG. 1, there is schematically illustrated in the form of a block diagram a recorder/player, generally indicated with a reference numeral 1, incorporating an adaptive equalizer 10 according to the present invention.

As shown in FIG. 1, the recorder/player 1 is an apparatus to write and/or read data to and/or from a disk-shaped recording medium 2 such as an optical disk, magnetic disk or the like. The disk-shaped recording medium 2 is capable of a signal recording which allows inter-symbol interference during playback on the presumption that the playback system is a transversal filter. Also, the disk-shaped recording medium 2 is a disk which records a row of coded data, and the data is read from the disk by the maximum-likelihood decoding such as Viterbi decoding or FDTS decoding.

The recorder/player 1 includes a head unit 3 which writes and/or reads signals to and/or from the disk-shaped recording medium 2. The head unit 3 includes a magnetic head, optical pickup or the like, for example. Also, the recorder/player 1 includes a modulation circuit 4 to modulate a row of to-be-recorded data supplied from outside, and a recording control circuit 5 to control data write to the disk-shaped recording medium 2 by driving the head unit 3 according to the modulated to-be-recorded-data row. The recorder/player 1 further includes a preamplifier 6 to generate a read signal from a signal read by the head unit 3 from the disk-shaped recording medium 2, an automatic gain control (AGC) amplifier 7 to control the gain of the read signal generated by the preamplifier 6, a phase locked loop (PLL) circuit 8 to make analog-digital conversion of the read signal having the gain thereof controlled by the AGC circuit 7 into a digital signal and generate a clock for the read signal, an adaptive equalizer 10 to make PR equalization and maximum-likelihood decoding of the read signal for which the clock has been generated by the PLL circuit 8, thereby generating a binary signal, and a demodulation circuit 9 to demodulate the binary signal supplied from the adaptive equalizer 10 and output reproduced data.

The adaptive equalizer 10 makes PR equalization and maximum-likelihood decoding of the read signal to output the signal recorded in the disk-shaped recording medium 2 as a binary signal. The adaptive equalizer 10 also generates a level error required for the AGC circuit 7 to control the gain and a phase error required for the PLL circuit 8 to synchronize the clock signal and read signal with each other.

As above, the adaptive equalizer 10 according to the present invention is used as a waveform equalizer when playing a disk-shaped recording media. It should be noted that the application of the adaptive equalizer 10 for playing a disk-shaped recording medium is just an example and the adaptive equalizer 10 may be applied to a player for reproducing coming signals provided that the player is a system using the partial response equalization based on the existence of an inter-symbol interference.

Overall Configuration of the Adaptive Equalizer 10

The adaptive equalizer 10 will be explained in further detail below concerning its internal configuration.

Figure 2:
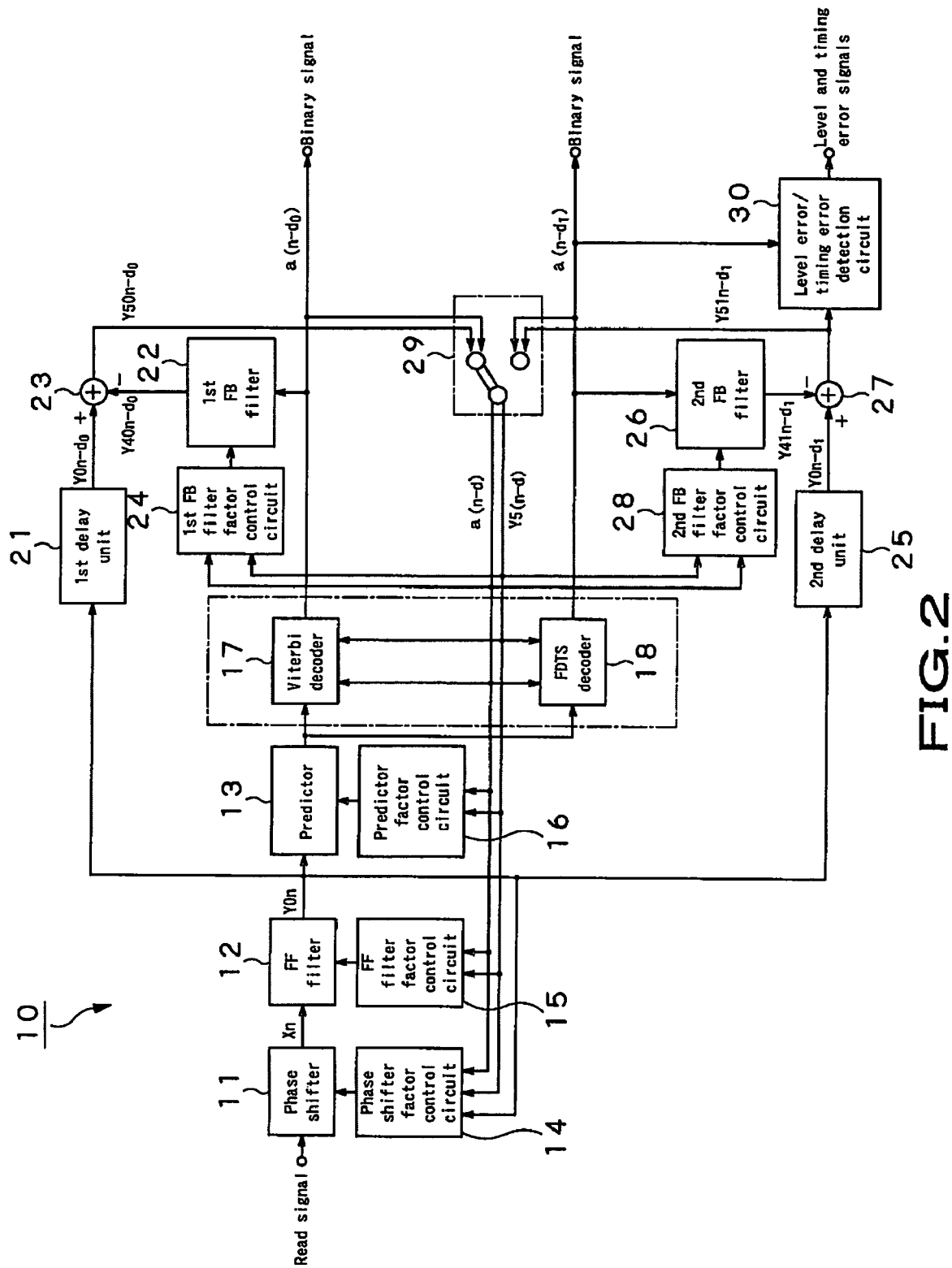
FIG. 2 is a block diagram of an adaptive equalizer according to the present invention.

FIG. 2 is a block diagram of the adaptive equalizer 10.

The adaptive equalizer 10 is supplied with a read signal sampled in the timing of the clock generated by the PLL circuit 8.

As shown in FIG. 2, the adaptive equalizer 10 includes a phase shifter 11 which is supplied with a read signal from the PLL circuit 8, an FF (feedforward) filter 12 which is supplied with the read signal supplied from the phase shifter 11, and a predictor 13 which is supplied with the read signal supplied from the FF filter 12.

Each of the phase shifter 11, FF filter 12 and predictor 13 is a filter circuit to filter an input signal. The adaptive equalizer 10 further includes a phase shifter factor control circuit 14 to adjust the tap factor of the phase shifter 11, an FF filter factor control circuit 15 to adjust the tap factor of the FF filter 12, a predictor factor control circuit 16 to adjust the tap factor of the predictor 13.

The adaptive equalizer 10 further includes a Viterbi decoder 17 which is supplied with a read signal from the predictor 13 and makes pass feedback Viterbi decoding of the supplied read signal to generate a binary signal, and an FDTS (fixed delay tree search) decoder 18 which is supplied with the read signal supplied from the predictor 13, and makes pass feedback FDTS decoding of the supplied binary signal to generate a binary signal.

Each of the above Viterbi decoder 17 and FDTS decoder 18 is a circuit which makes maximum-likelihood decoding of the read signal subjected to the partial response equalization to output a data row (binary signal) represented by 0 and 1 (or 1 and −1). It should be noted that the Viterbi decoder 17 and FDTS decoder 18 share an internal branch metric calculation circuit, ACS (add compare select) circuit, etc. This circuit sharing will be described in detail later.

The adaptive equalizer 10 also includes a first delay unit 21 to delay the read signal supplied from the FF filter 12 by a predetermined length of time, a first feedback filter (first FB filter) 22 which is supplied with the binary signal from the Viterbi decoder 17 and filters the binary signal, a first subtracter 23 to subtract the output signal from the first FB filter 22 from the output signal from the first delay unit 21, and a first FB filter factor control circuit 24 to adjust the tap factor of the first FB filter 22.

The adaptive equalizer 10 further includes a second delay unit 25 to delay the read signal supplied from the FF filter 12 by a predetermined length of time, a second feedback filter (second FB filter) 26 which is supplied with the binary signal from the Viterbi decoder 17 and filters the binary signal, a second subtracter 27 to subtract the output signal from the second FB filter 26 from the output signal from the second delay unit 25, and a second FB filter factor control circuit 28 to adjust the tap factor of the second FB filter 26.

The adaptive equalizer 10 also includes a selector 29 which is supplied with the binary signal from the Viterbi decoder 17 and subtraction signal from the first subtracter 23 as well as with the binary signal from the FDTS decoder 18 and subtraction signal from the second subtracter 27. The selector 29 selects either a combination of the binary signal supplied from the Viterbi decoder 17 and subtraction signal supplied from the first subtracter 23 or a combination of the binary signal supplied from the FDTS decoder 18 and subtraction signal supplied from the second subtracter 27, and outputs it. The two signals selected by the selector 29 are supplied to the phase shifter factor control circuit 14, FF filter factor control circuit 15, predictor factor control circuit 16, first FB filter factor control circuit 24 and second FB filter factor control circuit 28, and used for calculation of a tap factor in each of the circuits. Also, the two signals selected by the selector 29 are also supplied to the Viterbi decoder 17 and FDTS decoder 18, in which they will be used for decoding calculation.

The adaptive equalizer 10 further includes a level error/timing error detection circuit 30. This level error/timing error detection circuit 30 is supplied with the binary signal from the FDTS decoder 18 and subtraction signal from the second subtracter 27 and generates a level error signal and timing error signal the AGC circuit 7 and PLL circuit 8 refer to.

Overview of PRML Equalization by the Adaptive Equalizer 10

The PRML equalization made by the adaptive equalizer 10 will be explained herebelow.

The FF filter 12 is to make waveform equalization which is based on the partial response. The FF filter 12 is provided upstream of the pass feedback maximum-likelihood decoder (Viterbi decoder 17 and FDTS decoder 18), and thus the adaptive equalizer 10 as whole will make an equalization based on PRML (partial response maximum-likelihood) equalization technique.

Further, the FF filter 12 equalizes only the distortion of the partial response at the leading edge and ISI response before the leading edge of a signal waveform to be equalized of the ISI (inter-symbol interference) included in the signal. That is to say, the FF filter 12 equalizes the signal waveform with no consideration given to the distortion of partial response after the leading edge and ISI after the trailing edge of the signal waveform, namely, with allowing the persistence of any distortion of partial response after the leading edge of the signal waveform and ISI after the trailing edge.

The "ISI" is an interference component from a symbol adjacent to and superposed on a signal waveform.

Also, the "ISI" before the leading edge of a signal waveform to be equalized" is an ISI existing temporally before the timing of the leading edge of the signal waveform when processed into a binary signal (timing of transition from 0 to 1). The ISI existing before the leading edge of the signal waveform will be referred to as "leading edge ISI" hereunder.

Also, the "ISI" after the trailing edge of a signal waveform to be equalized" is an ISI existing temporally before the timing of the trailing edge of the signal waveform when processed into a binary signal (timing of transition from 1 to 0). The ISI existing after the leading edge of the signal waveform will be referred to as "trailing edge ISI" hereunder.

In the adaptive equalizer 10, a distortion of partial response after the leading edge of a waveform to be equalized and trailing edge ISI response is generated from a binary signal having already been subjected to the maximum-likelihood decoding (Viterbi decoding and FDTS decoding) and the tap factor of the FF filter 12 is controlled for a combination of these responses with the response from the FF filter 12 to be a partial response, to thereby make the above equalization in the FF filter 12.

More particularly, the first FB filter 22 or second FB filter 26 generates a distortion of partial response and trailing edge ISI response from the result of judgment of the maximum-likelihood decoding. The first delay unit 21 or second delay unit 25 delays the result of response from the FF filter 12 by a time required for the maximum-likelihood decoding. The first subtracter 23 and second subtracter 27 subtract the distortion of partial response and trailing edge ISI response, generated from the binary signal after subjected to the maximum-likelihood decoding, from the delayed result of response from the FF filter 12. Then, the FF filter factor control circuit 15 adjusts the tap factor of the FF filter 12 so that each of the results of response supplied from the first subtracter 23 and second subtracter 27 is a partial response.

By adjusting the tap factor of the FF filter 12 as above, the FF filter 12 can positively remove a partial response of ISI before the leading edge of a waveform to be equalized and distortion of partial response before the leading edge, which could not be removed by the maximum-likelihood decoding. Depending upon the FF filter 12, however, a distortion of partial response existing after the leading edge of a waveform to be equalized and ISI after the trailing edge will persist in the result of response. However, since the persistent PR response distortion and ISI can be removed by a maximum-likelihood decoding (Viterbi decoding and FDTS decoding) which is made at a downstream stage, the signal-to-noise ration (S/N ratio) will generally be improved.

Further, the FF filter 12 includes a linear adaptive equalization filter and high-order adaptive equalization Volterra filter which is a nonlinear filter, connected in parallel to each other. Thus, the FF filter 12 adds outputs from the linear and nonlinear filters together. So, the FF filter 12 can adaptively compensate a nonlinear equalization error when an input read signal has a nonlinearity represented by asymmetry and output an approximately linearity result of equalization.

Next, how the above PR equalization is done will be described in detail using mathematical expressions.

Figure 3:
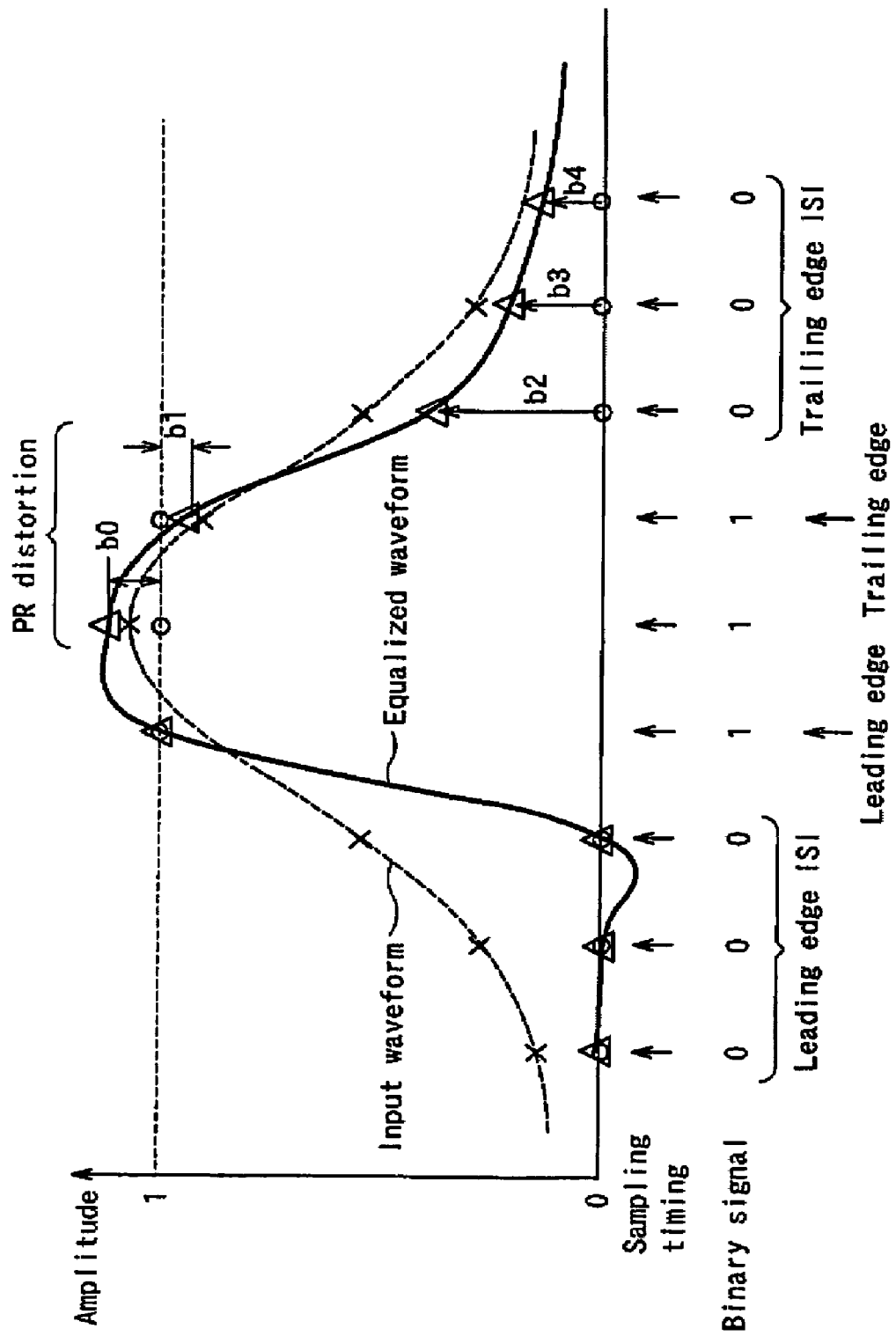
FIG. 3 shows an example of input waveform to an FF filter shown in FIG. 2.

First, the FF filter 12 is supplied with a sampled read signal indicated with a dash line as in FIG. 3. For example, when the first two data are equalized for the tap factor to be a partial response of PR(111), the adaptive equalizer 10 will output an equalized waveform indicated with a solid line as in FIG. 3, which is not in the normal PR equation.

The equalized wave is taken as y0n. The y0n is given by the following equation (1):

$$y0_n = \sum_{i=0}^{PR\_len-1} c_i \cdot a_{n-i} + \sum_{i=0}^{fbf\_len-1} b_i \cdot a_{n-1-i} + w_n \quad (1)$$

In the above equation, $c_i$ is a commonly expressed tap factor of partial response, whose interference length is taken as pr_len. When the tap factor of partial response is PR(11), for example, $c_0=1$, $c_1=1$ and pr_len=2. When the tap factor is PR(121), $c_0=1$, $c_1=2$, $c_2=2$ and pr_len=3. When the tap factor is PR(111), $c_0=1$, $c_1=2$, $c_2=21$ and pr_len=3.

Also in the above equation, $b_i$ is a term indicating a distortion which a deviation from an anticipated partial response. Also, $a_n$ is the value of NRZ data recorded at a time n and takes value of +1. Further, $w_n$ indicates an superposed noise.

The adaptive equalizer 10 operates to make an equalization with allowing a deviation from a partial response as the second term of the above equation (1).

Each of the components of the adaptive equalizer 10, which implement the aforementioned operations, will be described in detail below.

FF Filter

The FF filter 12 is a digital filter composed of a linear adaptive equalization filter and high-order adaptive equalization Volterra filter, connected in parallel to each other, to make a calculation of a next equation (2-1).

$$y0_n = y01_n + y02_{n'} \quad (2\text{-}1)$$

$$y01_n = \sum_{i=0}^{fff\_len-1} f_i \cdot x_{n-i} \quad (2\text{-}2)$$

$$y02_n = \sum_{i=0}^{fff\_len2-1} \sum_{j=0}^{fff\_len2-1} fv_{ij} \cdot x_{n-i} \cdot x_{n-j} + \quad (2\text{-}3)$$
$$\sum_{i=0}^{fff\_len3-1} \sum_{j=0}^{fff\_len3-1} \sum_{k=0}^{fff\_len3-1} fv_{ijk} \cdot x_{n-i} \cdot x_{n-j} \cdot x_{n-k} \cdots$$

where $x_n$ indicates a signal supplied to the FF filter 12 at a time n, $y01_n$ as the right-side second term of the equation (2-1) is an output from the linear adaptive equalization filter (in the equation (2-2)), and $y02_n$ as the right-side second term of the equation (2-1) is an output from the high-order adaptive equalization Volterra filter (in the equation (2-3)).

Figure 4:
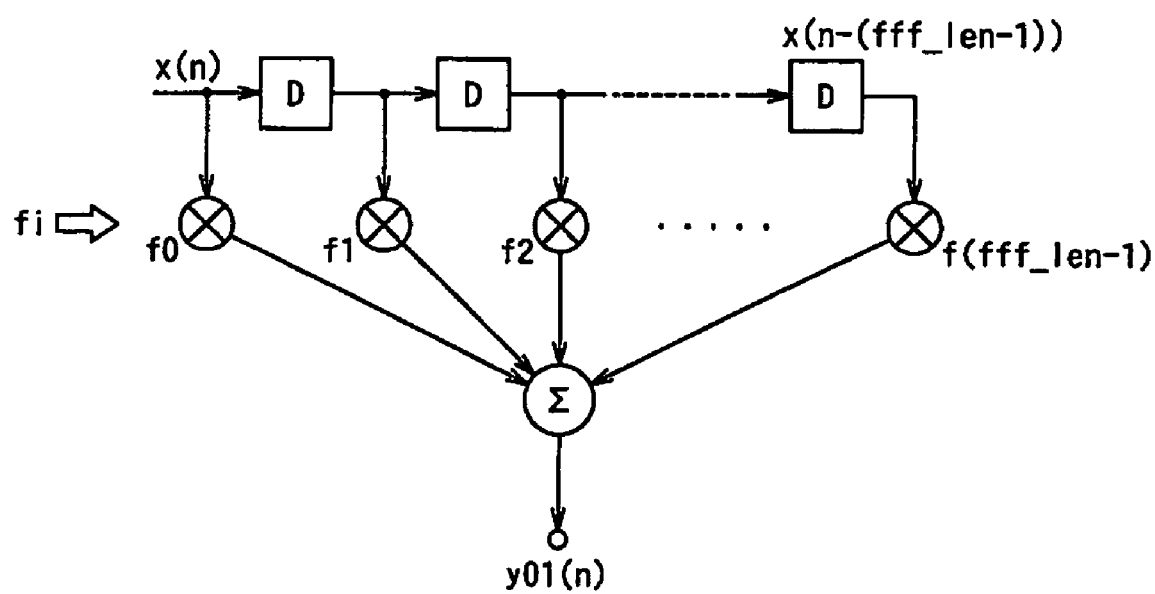
FIG. 4 shows an example of the configuration of a linear equalization filter provided in the FF filter shown in FIG. 2.

More particularly, the linear adaptive equalization filter is formed from an FF filter including an (fff_len–1)-stepped delay unit which delays an input signal at every sample, an (fff_len)-stepped multiplier which multiplies an input to a first multiplier step and output from each delay unit by a tap factor $f_i$ (i is an integer), and a sum adder which sums up the outputs from the multipliers and outputs the right-side first term $y01_n$ of the equation (2-1) as shown in FIG. 4. It should be noted that the tap factor $f_i$ (i is an integer) supplied to each multiplier is generated by the FF filter factor control circuit 15 which will be described in detail later.

Figure 5:
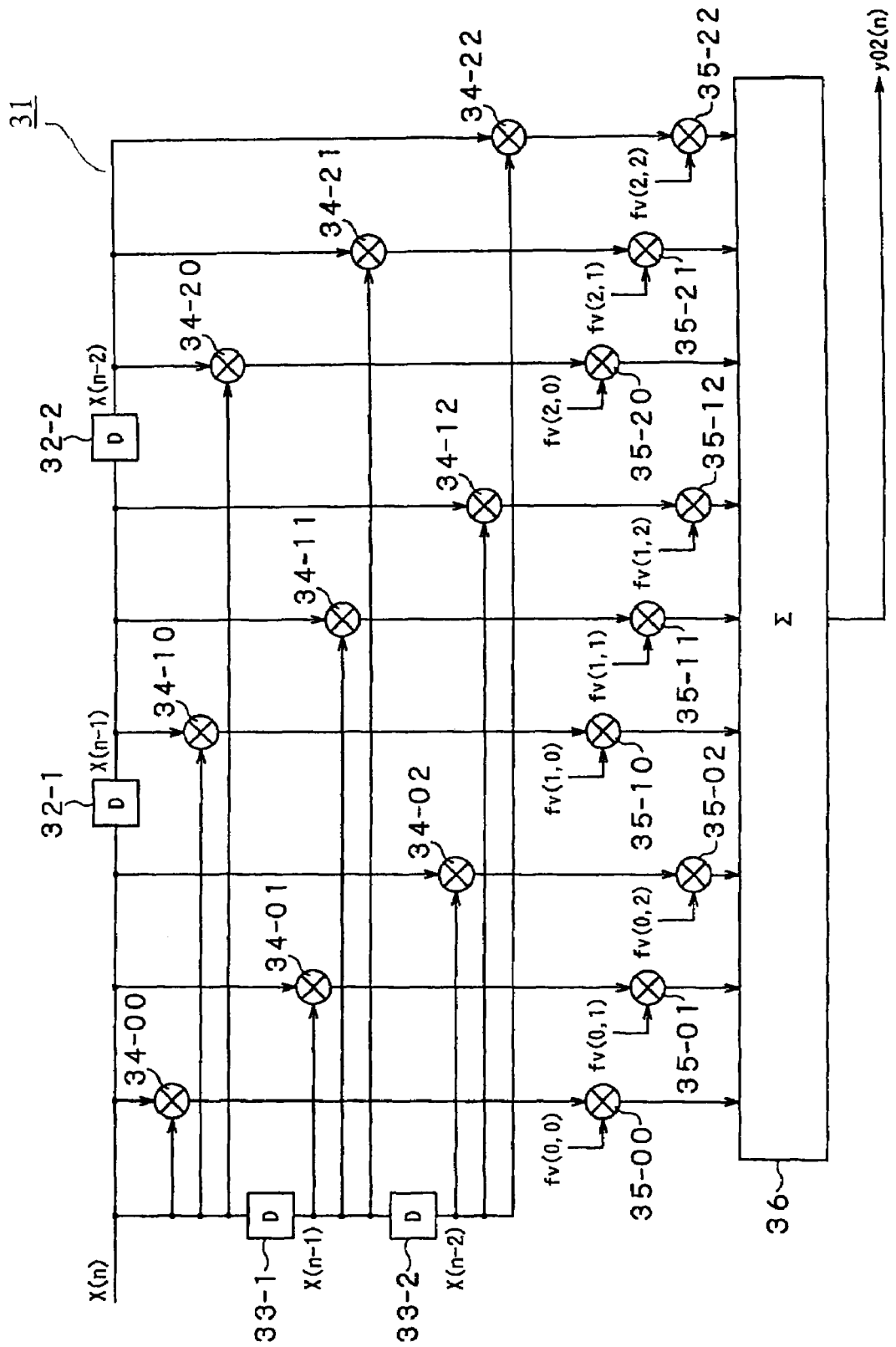
FIG. 5 shows an example of the configuration of a secondary Volterra filter provided in the FF filter shown in FIG. 2.

The high-order adaptive equalization Volterra filter is a Volterra filter to make a nonlinear equalization on the presumption that the input waveform has been expanded in a Volterra series. More specifically, a secondary Volterra filter 31, for example, includes two horizontal delay unit stages 32-1 and 32-2, and two vertical delay unit stages 33-1 and 33-2 as shown in FIG. 5. The horizontal delay units 32-1 and 32-2 and the vertical delay units 33-1 and 33-2 generate an input signal $x_n$, an input signal $x_{n-1}$ delayed by one sample, and an input signal $x_{n-2}$ delayed by two samples.

The secondary Volterra filter 31 further includes a first multiplier 34-00 to multiply input signals x(n) together, a second multiplier 34-01 to multiply the input signal x(n) by an input signal $x_{(n-1)}$ delayed by one sample, a third multiplier 34-02 to multiply the input signal x(n) by an input signal $x_{(n-1)}$ delayed by two samples, a fourth multiplier 34-10 to multiply the input signal $x_{(n-1)}$ delayed by one sample by the input signal x(n), a fifth multiplier 34-11 to multiply the input signals $x_{(n-1)}$ delayed by one sample together, a sixth multiplier 34-12 to multiply the input signal $x_{(n-1)}$ delayed by one sample by input signal $x_{(n-1)}$ delayed by two samples, a seventh multiplier 34-20 to multiply the input signal $x_{(n-1)}$ delayed by two samples by the input signal x(n), an eighth multiplier 34-21 to multiply the input signal $x_{(n-1)}$ delayed by two samples by input signal $x_{(n-1)}$ delayed by one sample, and a ninth multiplier 34-22 to multiply the input signal $x_{(n-1)}$ delayed by one sample by the input signal $x_{(n-1)}$ delayed one sample by the input signal $x_{(n-1)}$ delayed by two samples.

The secondary Volterra filter 31 also includes a first tap factor multiplier 35-00 to multiply the output signal from the first multiplier 31-00 by a tap factor $f_v(0,0)$, a second tap factor multiplier 35-01 to multiply the output signal from the second multiplier 31-01 by a tap factor $f_v(0, 1)$, a third tap factor multiplier 35-02 to multiply the output signal from the third multiplier 31-02 by a tap factor $f_v(0, 2)$, a fourth tap factor multiplier 35-10 to multiply the output signal from the fourth multiplier 31-10 by a tap factor $f_v(1, 0)$, a fifth tap factor multiplier 35-11 to multiply the output signal from the fifth multiplier 31-11 by a tap factor $f_v(1, 1)$, a sixth tap factor multiplier 35-12 to multiply the output signal from the sixth multiplier 31-12 by a tap factor $f_v(1, 2)$, a seventh tap factor multiplier 35-20 to multiply the output signal from the seventh multiplier 31-20 by a tap factor $f_v(2, 0)$, an eighth tap factor multiplier 35-21 to multiply the output signal from the eighth multiplier 31-21 by a tap factor $f_v(2, 1)$, and a ninth tap factor multiplier 35-22 to multiply the output signal from the ninth multiplier 31-22 by a tap factor $f_v(2, 2)$.

The secondary Volterra filter 31 also includes a sum adder 36 which sums up the outputs from the first to ninth tap factor multipliers 35-00 to 35-22 and outputs the right-side second term $y0\text{-}2_n$ of the above equation (2-1).

Note that the tap factors $f_v(ij)$ (i and j are integers) given to the first to ninth tap factor multipliers 35-00 to 35-22 have set therefor a value generated by the FF filter factor control circuit 15 which will be described in detail later). Note also that although the secondary Volterra filter has been described by way of example, the magnitude of the delay may not be only a secondary one but also it may be a tertiary, quartic or higher-order one.

The FF filter 12 is a combination of the aforementioned linear adaptive equalization filter and high-order adaptive equalization Volterra filter connected in parallel to each other. The tap factors $f_i$ and $fv_{ik}$ of the linear adaptive equalization filter and high-order adaptive equalization Volterra filter being controlled by the FF filter factor control circuit 15, the FF filter 12 makes adaptive PR equalization of a supplied read signal.

FB Filters

Each of the first and second FB filters 22 and 26 is a digital filter which is supplied with a binary signal $a_{(n-d)}\{=(a_{(n-d0)}$ or $a_{(n-d1)})\}$ of $-1$ or $+1$ which is the result of provisional decision of the maximum-likelihood decoding (Viterbi decoding or FDTS decoding), and calculates, based on the input result of provisional decision $a_{(n-d)}$, partial response distortions (e.g., $b_0$ and $b_1$ in FIG. 3), two samples later, of the to-be-equalized waveform in the second term of the aforementioned equation (1) and trailing edge ISI responses (e.g., $b_2$, $b_3$ and $b_4$ in FIG. 3).

Note that although the adaptive equalizer 10 includes the first FB filter 22 which filters the result of provisional decision of the Viterbi decoder 17 and second FB filter 26 which filters the result of provisional decision of the FDTS decoder 18, only one of these filters is used for the PR equalization. One of the first and second FB filters 22 and 26 is selected by the selector 29 which will be described in detail later.

On the assumption that the calculation output from the first FB filter 22 which filters the result of provisional decision of the Viterbi decoder 17 is $y40_n$ and the calculation output from the second FB filter 26 which filters the result of provisional decision of the FDTS decoder 18 is $y41_n$, the first FB filter 22 will calculate the following equation (3-1) while the second FB filter 26 will calculate the following equation (3-2):

$$y40_{n-d0} = \sum_{i=0}^{fbf\_len-1} b_i \cdot \hat{a}_{n-(d0+1)-i} \quad (3\text{-}1)$$

$$y41_{n-d1} = \sum_{i=0}^{fbf\_len-1} b_i \cdot \hat{a}_{n-(d1+1)-i} \quad (3\text{-}2)$$

where d0 indicates a delay of decision of the Viterbi decoder 17 and d1 indicates a delay of decision of the FDTS decoder 18, both being an integer larger than 0. It should be noted that d0 and d1 will be represented by d when it is not necessary to represent them distinctively from each other.

Figure 6:
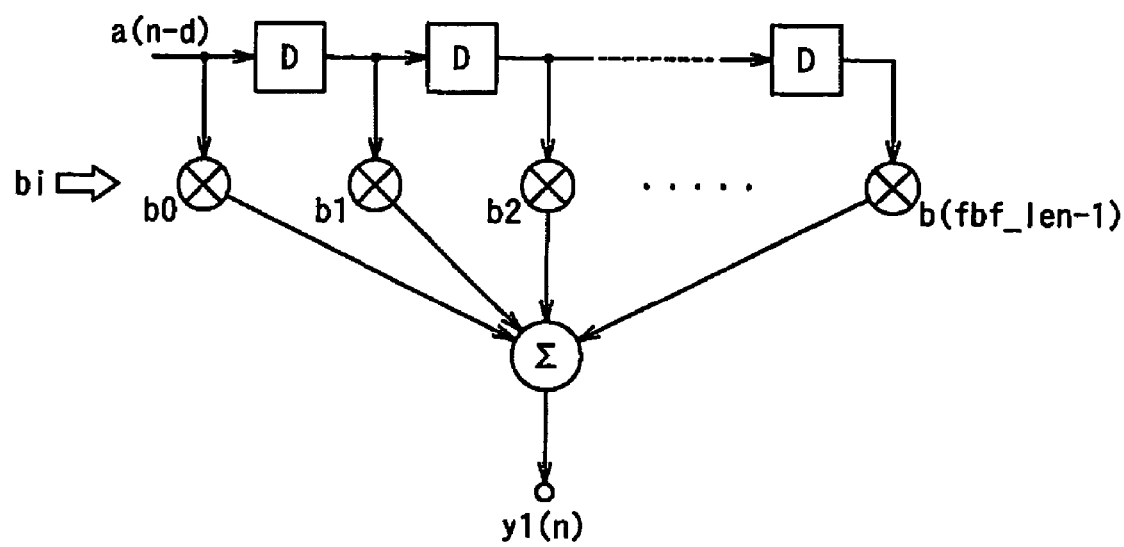
FIG. 6 shows an example of the configuration of an FB filter sown in FIG. 2.

More specifically, each of the first and second FB filters 22 and 26 is formed from an FIR filter including, as shown in FIG. 6, an (fbf_len−1)-stepped delay unit which delays an input signal at every sample, an (fbf_len)-stepped multiplier which multiplies an input to the first delay unit step and output from each delay unit step by a tap factor $b_i$ (i is an integer), and a sum adder which sums up outputs from all the multiplier steps and outputs $y40_n$ and $y41_n$ of the aforementioned equations (3-1) and (3-2).

Note that the tap factor $b_i$ (i is an integer) given to each multiplier step has set therefor a value generated by the first FB filter factor control circuit 24 or second FB filter factor control circuit 28, which will be described in detail later.

Each of the first and second FB filters 22 and 26 is a linear adaptive equalization filter having been described above, and has the tap factor $b_i$ thereof controlled by the FF filter factor control circuit 15 to output a distortion of partial response after the leading edge of a waveform to be equalized and ISI response after the trailing edge of the waveform.

Delay Units and Subtracters

The first delay unit 21 includes a shift register whose delay amount (d0) corresponds to a delay required for the decision by the Viterbi decoder 17. The first delay unit 21 is supplied with the result of response $y0_n$ of the FF filter 12. Therefore, the output from the first delay unit 21 will be $y0_{(n-d0)}$.

In this embodiment, since the delay of decoding of the Viterbi decoder 17 is pmem_len clock, $y0_n$ is delayed by pmem_len(=d0). That is, the output signal from the first delay unit 21 will be y0(n-pmem_len).

The second delay unit 25 includes a shift register whose delay amount (d1) corresponds to the delay required for decision by the FDTS decoder 18. The second delay unit 25 is supplied with the result of response $y0_n$ of the FF filter 12. Therefore, the output from the second delay unit 25 will be $y0_{(n-d1)}$. In this embodiment, since the delay of decoding of the FDTS decoder 18 is three clocks, the second delay unit 25 will delay $y0_n$ 3(=d1) clocks. That is, the output signal from the second delay unit 25 will be $y0_{(n-3)}$.

The first subtracter 23 subtracts the result of output from the FB filter 22 of the recorder/player 1 from the result of response of the FF filter 12, delayed by a time required for decision by the Viterbi decoding. On the assumption that the output signal from the first subtracter 23 is $y50_n$, this signal $y50_n$ is given by the following equation (4-1):

$$y50_{n-d0} = \sum_{i=0}^{fff\_len-1} f_i \cdot x_{n-d0-i} - \sum_{i=0}^{fbf\_len-1} b_i \cdot \hat{a}_{n-(d0+1)-i} \quad (4\text{-}1)$$

The second delay unit 25 is a memory whose delay amount corresponds to a delay required for decision by the FDTS decoder 18. The second delay unit 25 delays the result of response of the FF filter 12. Also, the second subtracter 27 subtracts the result of output from the second FB filter 26 from the result of response of the FF filter 12, delayed by a time required for decision by the FDTS decoding. On the assumption that the signal output from the second subtracter 27 is $y51_n$, the signal $y51_n$ is given by the following equation (4-2):

$$y51_{n-d1} = \sum_{i=0}^{fff\_len-1} f_i \cdot x_{n-d1-i} - \sum_{i=0}^{fbf\_len-1} b_i \cdot \hat{a}_{n-(d1+1)-i} \quad (4\text{-}2)$$

Selector

The selector 29 supplies a provisional decision result $a_{(n-d)}$ and a response $y50_{n-d}$ resulted from removal of a distortion and trailing edge ISI from the partial response (such waveform signal will also be referred to as "removal waveform or removal waveform signal" hereunder wherever appropriate) of the FF filter 12 to the phase shifter 11, FF filter 12, predictor 13 and first and second FB filter factor control circuits 24 and 28. At this time, the selector 29 selects either the result $a_{(n-d0)}$ from the Viterbi decoder 17 and $Y50_{n-d0}$ or the result $a_{(n-d1)}$ of the FDTS decoder 18 and $y51_{n-d1}$, whichever is to be used. The selected provisional decision result output from the selector 29 is represented by $a_{(n-d)}$ and a waveform resulted from removal of a distortion and trailing edge ISI from the partial response is represented by $y5_{(n-d)}$ as follows:

When the Viterbi decoding is selected:

$a_{(n-d)}=a_{(n-d0)}, y5_{(n-d)}=y50_{(n-d0)}$

When the FDTS decoding is selected:

$a_{(n-d)}=a_{(n-d1)}, y5_{(n-d)}=y51_{(n-d1)}$

FF Filter Factor Control Circuit

The FF filter factor control circuit 15 calculates a tap factor $f_i$ of the linear adaptive equalization filer of the FF filter 12 and tap factor $fv_{ij}$ of the high-order Volterra filter.

Figure 7:
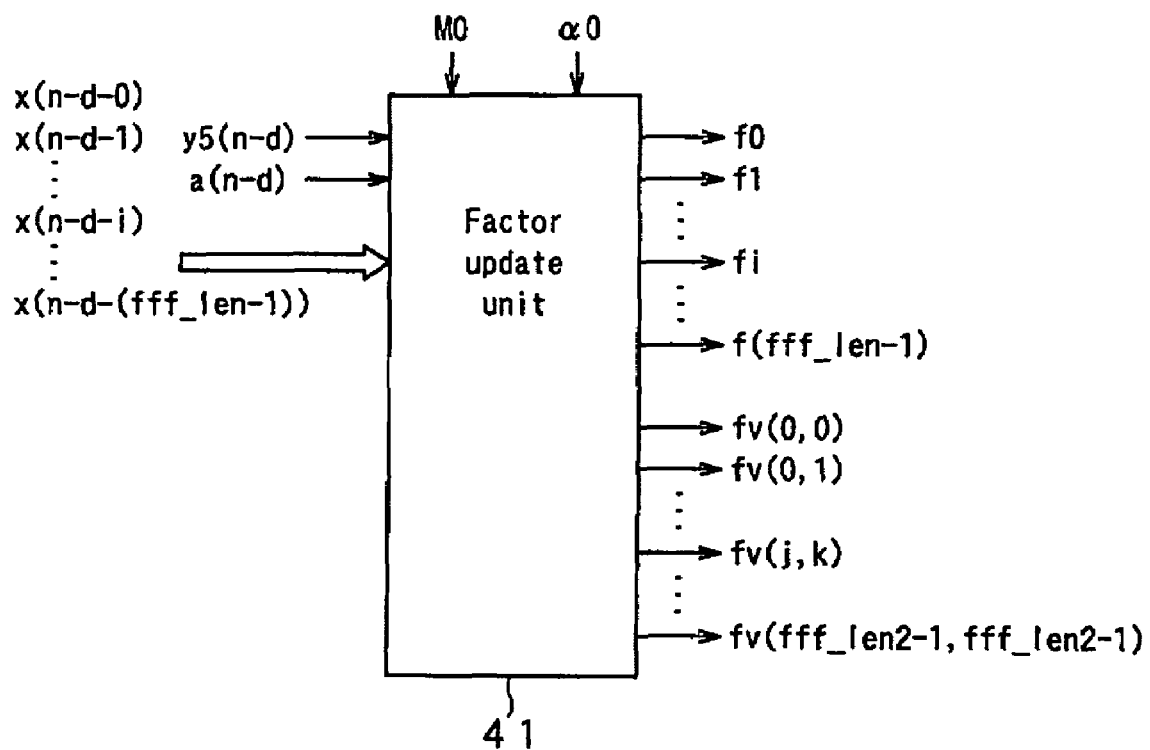
FIG. 7 is a block diagram of an FF filter factor control circuit shown in FIG. 2.

FIG. 7 is a block diagram of the FF filter factor control circuit 15. As shown in FIG. 7, the FF filter factor control circuit 15 includes an FF filter factor update unit 41. The FF filter factor update unit 41 is supplied with the provisional decision result $a_{(n-d)}$ of the maximum-likelihood decoder (Viterbi decoder 17 or FDTS decoder 18), waveform signal $y5_{(n-d)}$ supplied from the subtracter (first subtractor 23 or second subtracter 27) and which has been resulted from removal of a distortion and trailing edge ISI from the partial response, and signal $x_{(n-d-i)}$ (where i is an integer from 0 to fff_len−1) held in the relay unit of the FF filter 12. The tap factors $f_i$ and $fv_{ij}$ calculated by the FF filter factor control circuit 15 are supplied to each multiplier which multiplies the tap factors of the FF filter 12 together.

The FF filter factor update unit 41 controls the tap factors $f_i$ and $fv_{ij}$ of the FF filter 12 so that the waveform signal $y5_{(n-d)}$ resulted from removal of a distortion and trailing edge ISI from the partial response coincides with the partial response (PR( )) of the result of maximum-likelihood decoding. Namely, the FF filter factor update unit 41 controls the tap factors $f_i$ and $fv_{ij}$ of the FF filter 12 so that the response of the FF filter 12 coincides with a response resulted from removal of a distortion and trailing edge ISI from the partial response. In other words, the FF filter factor update unit 41 controls the tap factors $f_i$ and $fv_{ij}$ of the FF filter 12 so that the response of the FF filter 12 coincides with a response which will nullify the distortion of partial response at the leading edge and remove the leading edge ISI.

Note that the FF filter factor update unit 41 calculates the tap factors $f_i$ and $fv_{ij}$ on the basis of the LMS algorithm.

For evaluation of the LMS algorithm, a square error F(n) between the waveform signal $y5_{(n-d)}$ resulted from removal of a distortion and trailing edge ISI from the partial response and the partial response of the provisional decision result of the maximum-likelihood decoding, as given by the following equation (5), will first be discussed as an evaluation function of an output waveform from the FF filter 12 herebelow:

$$F(n)=\{y5_{n-d}-PR(a_{n-d})\}^2 \quad (5)$$

where n indicates a current time and PR( ) is a function which provides a reference waveform for a desired partial response. On the assumption of PR(111), $a_{(n-d)}+a_{(n-d-1)}+a_{(n-d-2)}$ will be calculated.

On the assumption that an input waveform $y5_{(n-d)}$ having a nonlinear distortion can approximately be expanded into a secondary Volterra series for an input signal x(n), the input waveform $y5_{(n-d)}$ can be given by the following equation (6):

$$y5_{n-d} = \sum_{i=0}^{fff\_len-1} f_i \cdot x_{n-d-i} + \sum_{j=0}^{fff\_len2-1} \sum_{k=0}^{fff\_len2-1} fv_{jk} \cdot x_{n-d-j} \cdot x_{n-d-k} \quad (6)$$

Partial differentiation of F(n) in the equation (5) as to the tap factor $f_i$ of the index i of the linear adaptive equalization filer of the FF filter 12 is given by the following equation (7):

$$\frac{\partial}{\partial f_i} F(n) = 2\{y5_{n-d} - PR(a_{n-d})\} \cdot x_{n-d-i} \quad (7)$$

The LMS algorithm is to control the filter factor for minimization of the square error. Therefore, by multiplying the partial differentiation value of the square error by an appropriate gain and subtracting the result of multiplication from the tap factor $f_i$, the linear adaptive equalization filter will make adaptive filtering so that the waveform signal $y5_{(n-)}$ resulted from removal of a distortion and trailing edge ISI from the partial response will follow up the partial response.

Similarly, the partial differentiation of a tap factor $fv_{jk}$ of the indexes j and k of the secondary adaptive equalization Volterra filter is given by the following equation (8):

$$\frac{\partial}{\partial fv_{jk}} F(n) = 2\{y5_{n-d} - PR(a_{n-d})\} \cdot (x_{n-d-j} \cdot x_{n-d-k}) \quad (8)$$

That is to say, the update algorithm for the tap factor of the nonlinear adaptive equalization Volterra filter is only different from that for the tap factor of the linear adaptive equalization filter in that the partial differentiation is expressed with a product of two signals with delays j and k in addition to a fixed delay d from an input signal x(n) at the current time n. In other words, the tap factor update unit for the nonlinear adaptive equalization Volterra filter is similar in configuration to that for the linear adaptive equalization filter.

Therefore, by multiplying a partial differentiation value of a square error by an appropriate gain and subtracting the result of multiplication from the tap factor $fv_{jk}$, adaptive filtering will be done by the high-order Volterra filter which is a nonlinear equalization filter so that the waveform signal $y5_{(n-)}$ resulted from removal of a distortion and trailing edge ISI from the partial response follows up the partial response.

Figure 8:
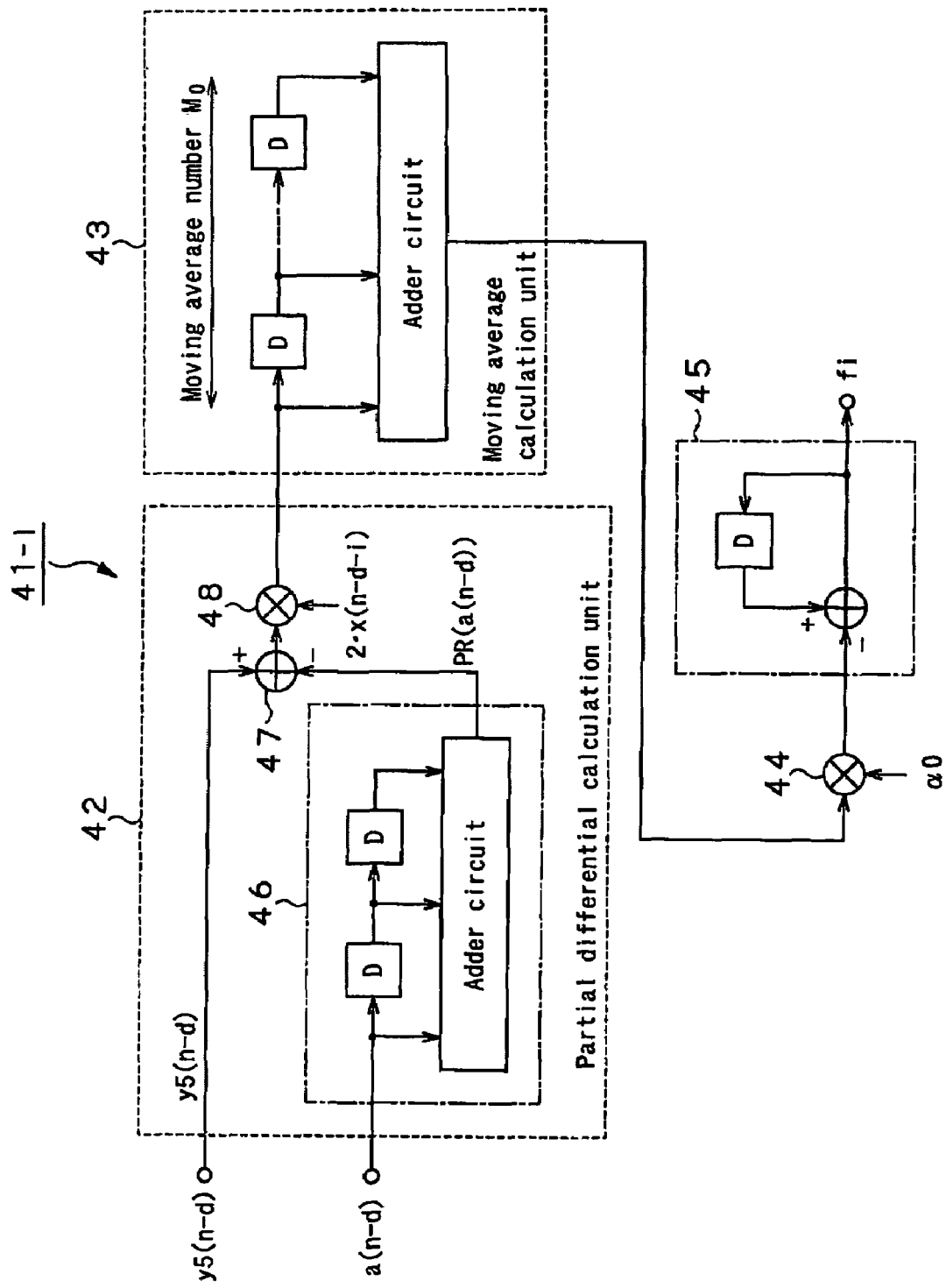
FIG. 8 shows an factor update unit for the linear equalization filter in the FF filter.

FIG. 8 shows a factor calculation circuit 41-i to calculate the tap factor $f_i$ of the index i of the linear adaptive equalization filter in the FF filter 12. It should be noted that the FF filter factor update unit 41 incorporates a factor calculation circuit for each index and all these factor calculation circuits are of the same configuration.

The factor calculation circuit 41-i includes a partial differentiation unit 42, moving average unit 43, gain multiplier 44 and factor update unit 45.

The partial differentiation unit 42 includes a filter circuit 46 to calculate a reference waveform $PR(a_{(n-d)})$ of the partial response from the result of provisional decision $a_{(n-d)}$, a subtracter 47 to subtract $PR(a_{(n-d)})$ from the waveform signal $y5_{(n-d)}$ resulted from removal of a distortion and trailing edge ISI from the partial response, and a multiplier 48 to multiply the result of subtraction from the subtracter 47, a signal $x_{(n-d-i)}$ held in the delay unit of the FF filter 12 and "2" together. The partial differentiation unit 42 can have the multiplier 48 output the result of partial differentiation as given by the aforementioned equation (7).

The moving average unit 43 makes moving average of the result of partial differentiation, for example, a moving average number $M_0$. The multiplier 44 multiplies the result of moving average from the moving average unit 43 by a gain $\alpha_0$.

The factor update unit 45 subtracts the result of partial differentiation multiplied by a moving-averaged gain $\alpha_0$ from a factor value $f_i$ one clock before. Thus, the factor update unit 45 will update the partial differentiation result toward zero.

Figure 9:
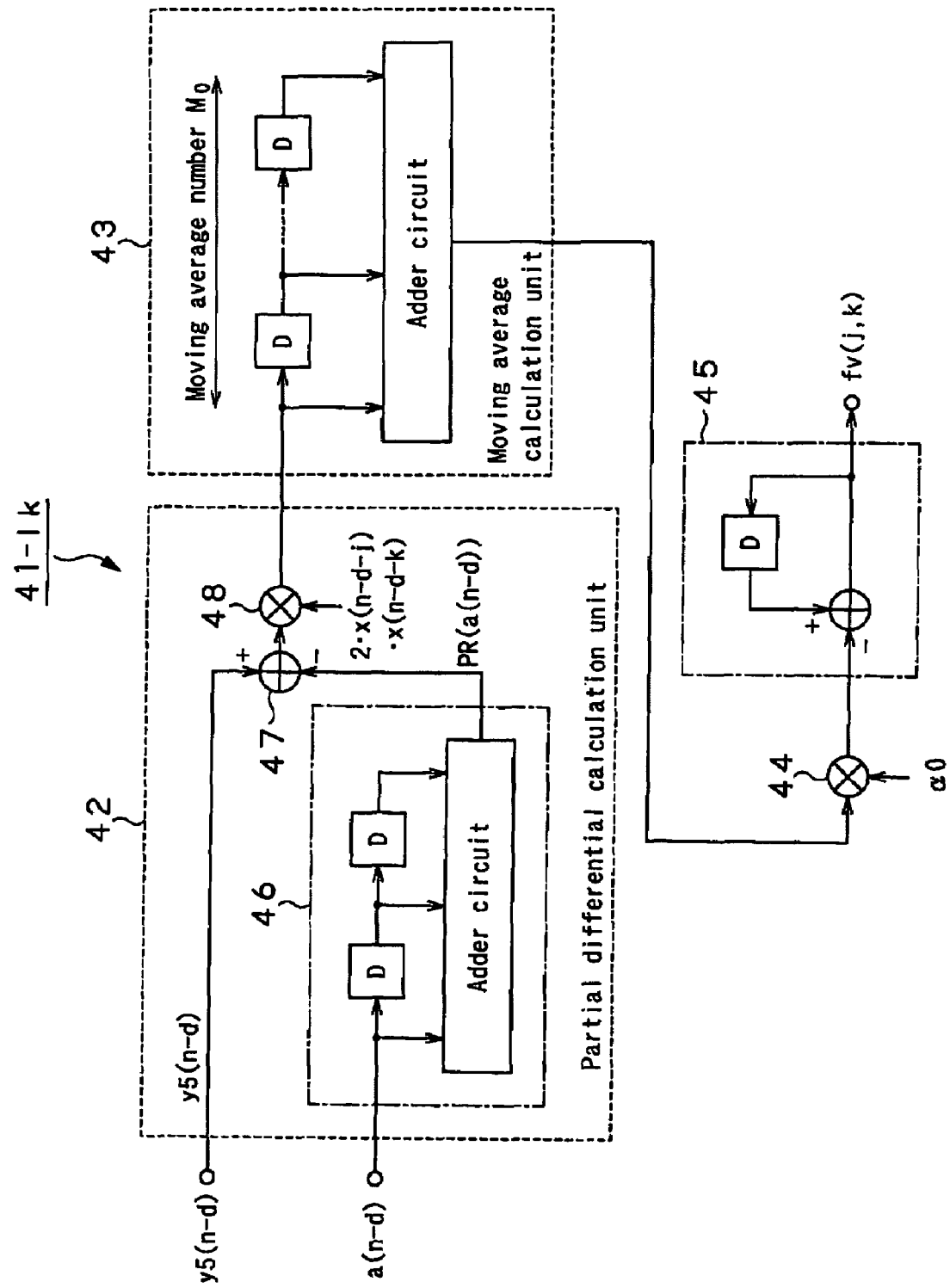
FIG. 9 shows the factor update unit for the Volterra filter in the FF filter.

FIG. 9 shows, in detail, a factor calculation circuit 41-$ik$ to calculate the tap factor $fv_{ik}$ of the index ik of the high-order nonlinear adaptive equalization Volterra filter in the FF filter 12. It should be noted that the FF filter factor update unit 41 incorporates a factor calculation circuit for each index and all these factor calculation circuits are of the same configuration.

The factor calculation circuit 41-$ik$ is equal in configuration to the factor calculation circuit 41-$i$ in the linear equalization filter except for the multiplier 48 in the partial differentiation unit 42, The multiplier 48 in the partial differentiation unit 42 of the factor calculation circuit 41-$ik$ multiplies the result of subtraction from the subtracter 47, signal $x_{(n-d-i)}$ held in the delay circuit of the FF filter 12, signal $x_{(n-d-k)}$ and "2" together.

FB Filter Factor Control Circuits

The first and second FB filter factor control circuits 24 and 28 calculate tap factors $b_i$ of the first and second FB filters 22 and 26, respectively.

Figure 10:
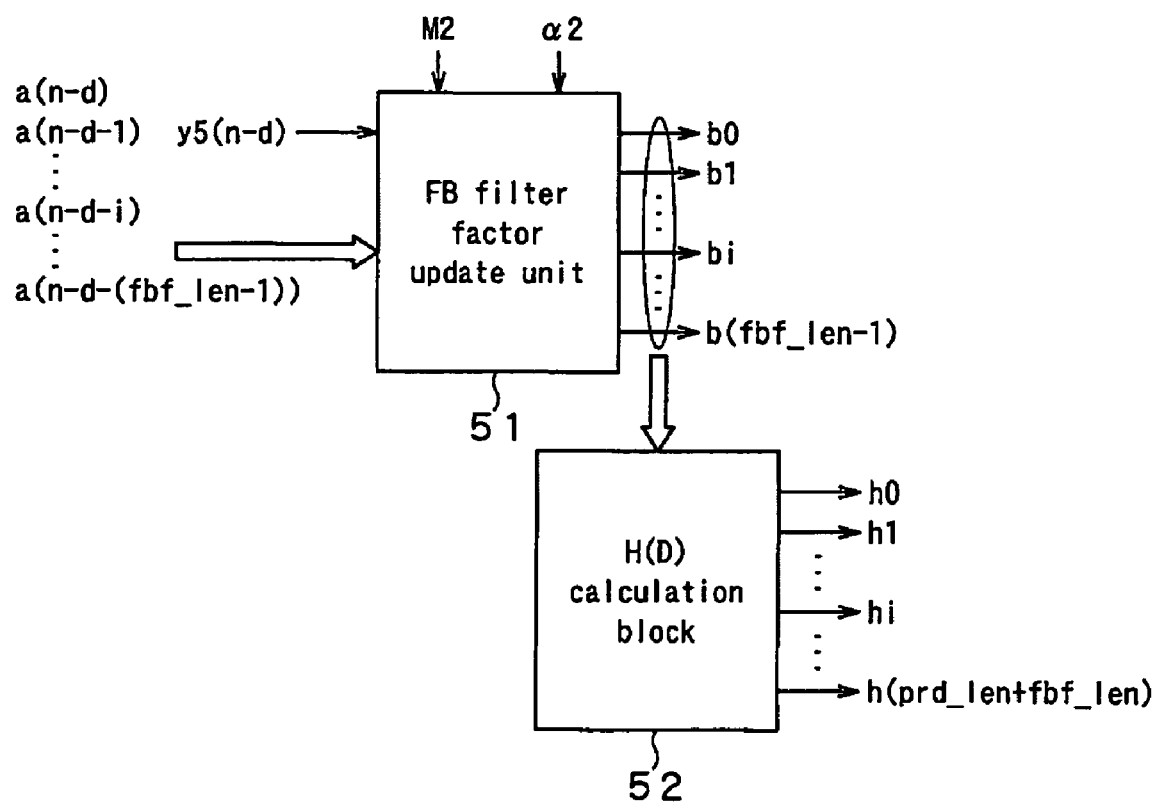
FIG. 10 is a block diagram of an FB filter factor control circuit shown in FIG. 2.

FIG. 10 is a block diagram of each of the FB filter factor control circuits 24 and 28. Each of the FB filter factor control circuits 24 and 28 includes an FB filter factor update unit 51 and H(D) calculation block 52.

The FB filter factor update unit 51 is supplied with the waveform $y5_{(n-d)}$ supplied from the first or second FB filter 22 and 26 and which has been resulted from removal of a distortion and trailing edge ISI from the partial response, and the result of provisional decision $a_{(n-d-i)}$ (where i is an integer from 0 to fff_len−1). The tap factor $b_i$ calculated by the FB filter factor control circuits 24 and 28 is supplied to each multiplier which calculates the tap factor of each of the first and second FB filters 22 and 26.

The H(D) calculation block 52 generates a transfer function H(D) used by the Viterbi decoder 17 and FDTS decoder 18. This generation will be described in detail later.

The FF filter factor update unit 51 controls the tap factor $b_i$ of the FB filters 22 and 26 so that the waveform signal $y5_{(n-d)}$ resulted from removal of a distortion and trailing edge ISI from the partial response coincides with the partial response (PR( )) as the result of maximum-likelihood decoding. That is, the FB filter factor update unit 51 controls the tap factor $b_i$ of the FB filters 22 and 26 for the responses from the FB filters 22 and 26 to coincide with the partial response distortion and trailing ISI response.

Note that the FB filter factor update unit 51 calculates the tap factor $b_i$ on the basis of the LMS algorithm.

For evaluation of the LMS algorithm adopted in the FB filter factor update unit 51, a square error F(n) between the waveform signal $y5_{(n-d)}$ resulted from removal of a distortion and trailing edge ISI from the partial response and the partial response of the provisional decision result of the maximum-likelihood decoding, as given by the following equation (5), will first be considered herebelow as having previously been explained as to the FF filter 12:

Partial differentiation of the square error F(n) given by the equation (5) as to the tap factor $b_i$ of the index i of the first and second FB filters 22 and 26 is given by the following equation (9):

$$\frac{\partial}{\partial b_i} F(n) = 2\{y5_{n-d} - PR(a_{n-d})\} \cdot (-a_{n-d-i}) \quad (9)$$

The LMS algorithm is to control the filter factor for minimization of the square error. Therefore, by multiplying the partial differentiation value of the square error by an appropriate gain and subtracting the result of multiplication from the tap factor $b_i$, adaptive filtering will be made for the response of the FB filters 22 and 26 to follow up the partial response distortion and trailing edge ISI response.

Figure 11:
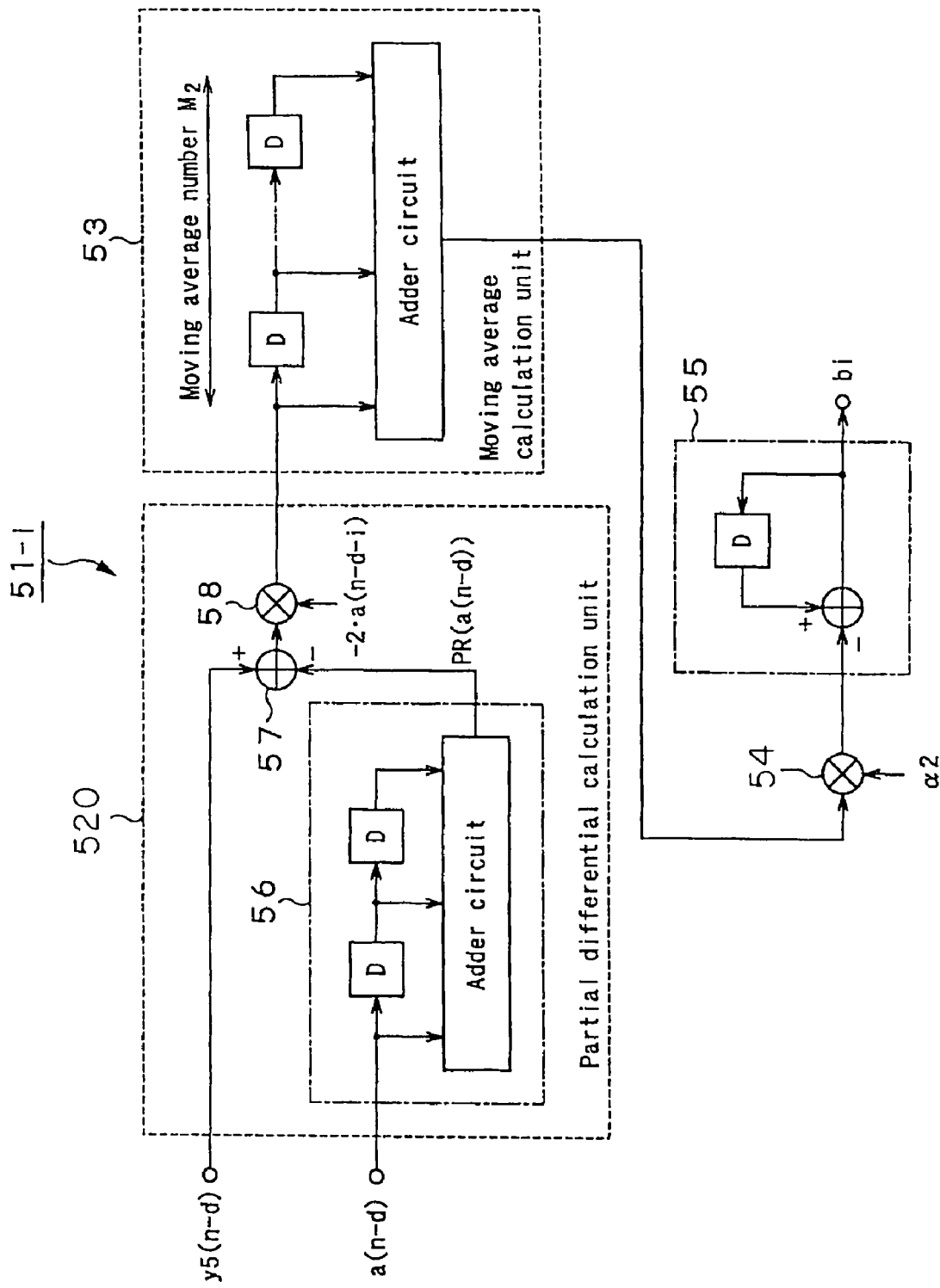
FIG. 11 shows a factor update unit for the FB filter.

FIG. 11 shows the details of a factor calculation circuit 51-$i$ to calculate the tap factor $b_i$ of the index i of the FB filters 22 and 26. It should be noted that the FB filter factor update unit 51 incorporates a factor calculation circuit for each index and all these factor calculation circuits are of the same configuration.

The factor calculation circuit 51-$i$ includes a partial differentiation unit 520, moving average unit 53, gain multiplier 54 and factor update unit 55.

The partial differentiation unit 520 includes a filter circuit 56 to calculate a reference waveform $PR(a_{(n-d)})$ of the partial response from the result of provisional decision $a_{(n-d)}$, a subtracter 57 to subtract $PR(a_{(n-d)})$ from the waveform signal y5(n−d) resulted from removal of a distortion and trailing edge ISI from the partial response, and a multiplier 58 to multiply the result of subtraction from the subtracter 57, a signal $a_{(n-d-i)}$ held in the delay units of the FF filters 12 and 26 and "−2" together. The partial differentiation unit 520 can have the multiplier 58 output the result of partial differentiation as given by the aforementioned equation (9).

The moving average unit 53 makes moving average of the result of partial differentiation, for example, a moving average number $M_0$. The multiplier 54 multiplies the result of moving average from the moving average unit 53 by a gain $\alpha_2$.

The factor update unit 55 subtracts the result of partial differentiation multiplied by a gain $\alpha_2$ from a factor value $b_i$ one clock before. Thus, the factor update unit 55 will update the partial differentiation result toward zero.

Predictor and Predictor Factor Control Circuit

Next, there will be explained the predictor 13 and the predictor factor control circuit 16 to calculate a tap factor $p_i$ of the predictor 13.

The noise in the read signal is normally a white noise (that is, a noise whose level is constant independently of any frequency). When the read signal is equalized by the FF filter 12, the noise will have a frequency characteristic. If the read signal includes a noise having a frequency characteristic, a noise highly correlative in the downstream maximum-likelihood decoder will spoil the detecting performance with the result that the bit error rate BER will be higher.

The predictor 13 is to whiten the noise included in a signal supplied to the maximum-likelihood decoder (Viterbi decoder 17 and FDTS decoder 18) and improve the overall detecting performance of the adaptive equalizer 10.

The predictor 13 is a digital filter which is supplied with an input signal $y0_n$ from the FF filter 12, has set therefor a prediction factor $p_i$ (i=1, 2, . . . , prd_len) to whiten the noise and calculates the following equation (10):

$$y2_n = y0_n - \sum_{i=1}^{prd\_len} p_i \cdot y0_{n-i} \quad (10)$$

Figure 12:
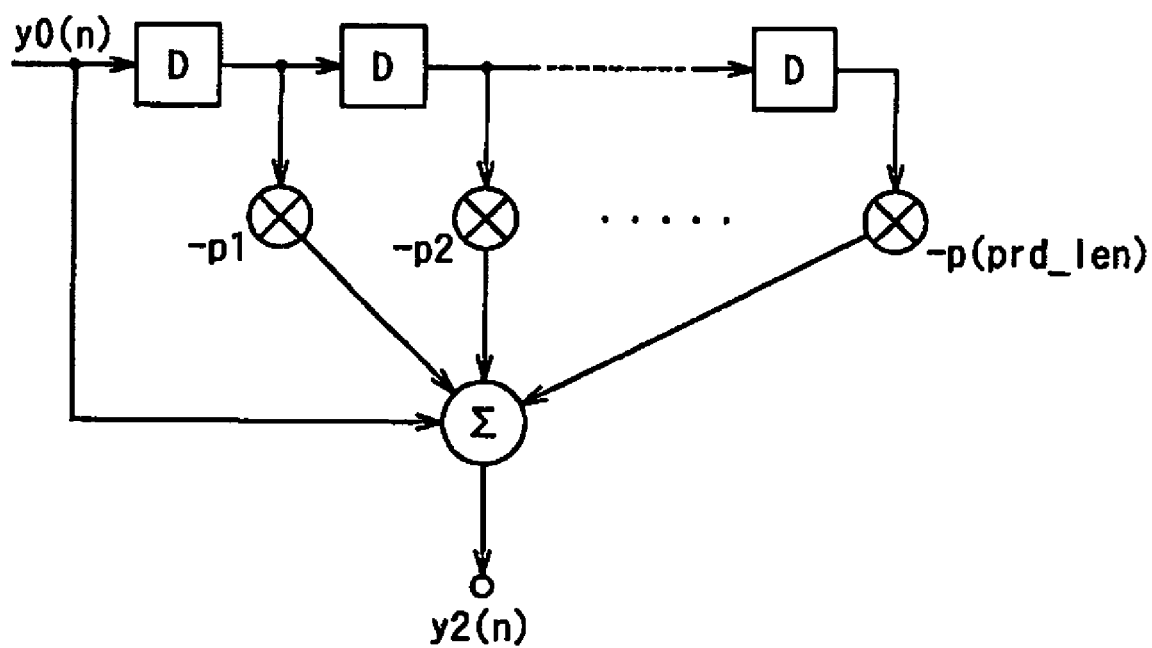
FIG. 12 shows an example of the configuration of a predictor shown in FIG. 2.

More specifically, the predictor 13 is an FIR filter including, as shown in FIG. 12, a (prd_len)-stepped delay unit to delay a signal $y0_n$ supplied from the FF filter 12 at every sample, a (prd_len)-stepped multiplier to multiply an output from each delay unit by a tap factor $p_i$ (i is an integer), and a sum adder to sum up an input to the first delay unit step and output from each multiplier step and output an output signal $y2_n$.

Note that the tap factor $p_i$ (i is an integer) supplied to each multiplier step has set therefor a value generated by the predictor factor control circuit 16.

Figure 13:
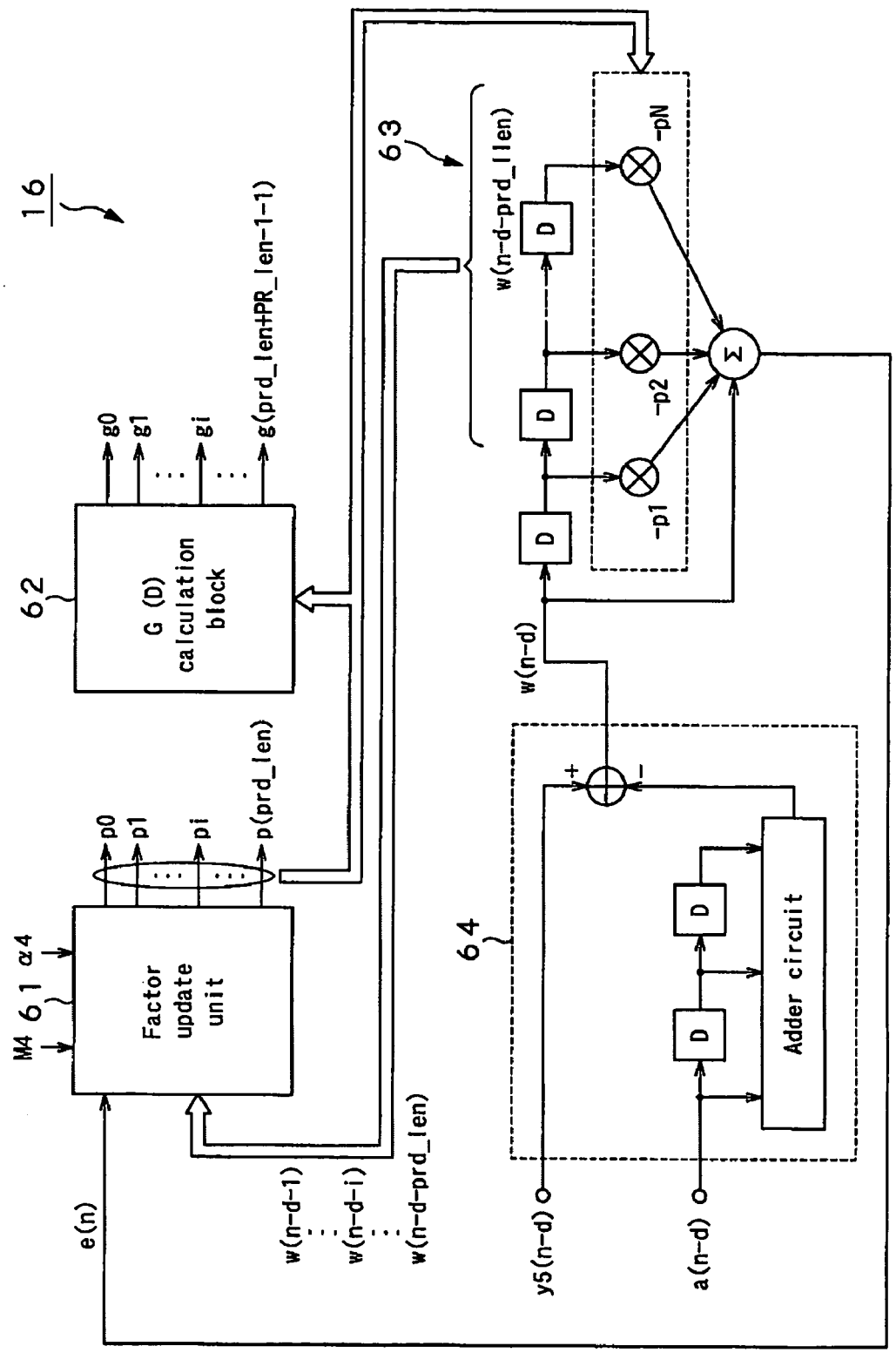
FIG. 13 is a block diagram of a predictor factor control circuit shown in FIG. 2.

The predictor factor control circuit 16 will be explained herebelow:

FIG. 13 is a block diagram showing the internal configuration of a predictor factor control circuit 16.

The predictor factor control circuit 16 includes a factor update unit 61, G(D) calculation block 62, noise predictor 63 and error calculation unit 64. The error calculation unit 64 is supplied with $y5_{(n-d)}$ and result of provisional decision $a_{(n-d)}$ and calculates an error signal $w_{(n-d)}$ at a time (n−d). The error $w_{(n-d)}$ is supplied to an FIR filter as the predictor 13, the result and signal $w_{(n-d-i)}$ are supplied to the factor update unit to update each tap factor $p_i$ (i=1, 2, . . . , prd_len).

An evaluation function $e^2(n)$ for the predictor, given by the following equation (11), will be considered:

$$e^2(n) = \left\{ w_{n-d} - \sum_{i=1}^{prd\_len} w_{n-d-i} \cdot p_i \right\}^2 \tag{11}$$

where n indicates a current time.

Then, there will be considered how to minimize the evaluation function with the LMS algorithm.

For example, partial differentiation of the tap factor $p_i$ of the index i of the predictor 13 is as given by the following equation (12):

$$\frac{\partial}{\partial p_i}[e^2(n)] = 2\left\{ w_{n-d} - \sum_{j=1}^{prd\_len} w_{n-d-j} \cdot p_j \right\} \cdot w_{n-d-i} \tag{12}$$

The above calculation is effected in the factor update unit 61.

Figure 14:
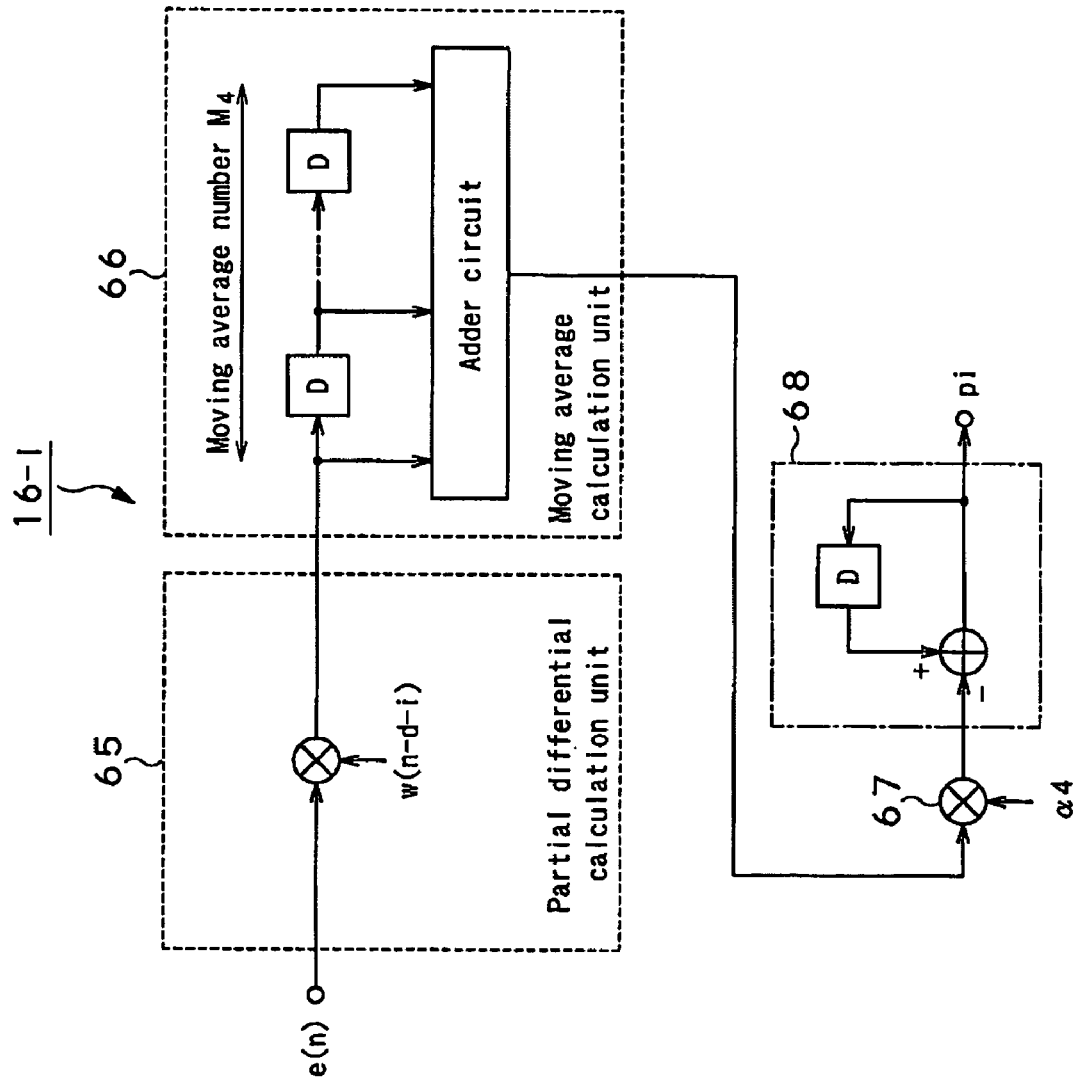
FIG. 14 is a block diagram showing, in detail, the factor update unit shown in FIG. 13.

FIG. 14 is a block diagram showing, in detail, the i-th one of the factor update units for the tap factor $p_i$. Namely, the factor update unit shown in FIG. 14 is provided for each of the number prd_len of tap factors but all the factor update units are of the same configuration. So, the i-th factor update unit will be described by way of example.

As shown, the partial differentiation is effected by a partial differentiation unit 65 including an adder, delay unit, etc. The result of partial differentiation is sent to a moving average calculation unit 66 which will make moving average of a given moving average number $M_4$. The result of moving average is multiplied by an update factor $\alpha_4$ by an update factor 4 by a multiplier 67, and subtracted from a tap factor $p_i$ one clock before by an adder 68.

The G(D) calculation block 62 will be explained later.

Viterbi Decoding and FDTS Decoding

Next, there will be described the operations of the Viterbi decoder 17 and FDTS decoder 18.

The branch metric operations of the FDTS and Viterbi decoders include a noise prediction as given by an equation (5) or (7) described in the "Noise-Predictive Maximum-Likelihood (NPML) Detection for the Magnetic Recording Channel" of E. Eleftheriou and W. Hirt as well as an operation for removal of a distortion and trailing edge ISI, which is the theme of the present invention. In this embodiment, however, the sign of the equation is taken as inverted on the presumption that a smallest metric is used. Also, although the description is made taking PR4 as an example, a generalized PR is taken as an example in this embodiment.

First, the transfer function P(D) of the predictor 13 can be given by the following equation (21):

$$P(D) = p_1 \cdot D + p_2 \cdot D^2 + \ldots + p_N \cdot D^N \tag{21}$$

The transfer function G(D) of the Viterbi decoder 17 is defined as given by the following equation (22):

$$G(D) = (c_0 + c_1 \cdot D + c_2 \cdot D^2 \ldots c_{PR\_len-1} \cdot D^{PR-len-1}) \cdot (1 - P(D)) = -g_0 - g_1 \cdot D \ldots - g_{prd\_len+PR\_len-1} \cdot D^{prd-len+PR\_len-1} \tag{22}$$

The factor gi(g0=−c0) in the above equation (22) is calculated by the G(D) calculation block 62 in the predictor factor control circuit 16 in FIG. 13.

Next, the transfer function H(D) for removing the distortion and trailing edge ISI, which is the feature of the present invention, is defined as given by the following equation (23):

$$H(D) = (b_0 \cdot D + b_1 \cdot D^2 \ldots b_{fbf\_len-1} \cdot D^{fbf-len}) \cdot (1 - P(D)) = -h_0 - h_1 \cdot D \ldots - h_{prd\_len+fbf\_len} \cdot D^{prd-len+fbf\_len} \tag{23}$$

The factor hi (h0=0) in the above equation (23) is calculated by the H(D) calculation block 52 in the FB filter factor control circuits 24 and 28 in FIG. 10.

Also, the branch metric at a time n is as given by the following equation (24):

$$\lambda_n = \left( y2_n + \sum_{i=0}^{prd\_len+PR\_len} a_{n-i} \cdot g_i + \sum_{i=0}^{prd\_len+fbf\_len} a_{n-i} \cdot h_i \right)^2 \tag{24}$$

Taking the FDTS branch metric at an abortion depth τ in consideration, the following equation (25) will be calculated:

$$\lambda_n = \left( y2_n + \sum_{i=\tau+1}^{prd\_len+PR\_len} \hat{a}_{n-i} \cdot g_i + \sum_{i=\tau+1}^{prd\_len+fbf\_len} \hat{a}_{n-i} \cdot h_i + \sum_{i=0}^{\tau} a_{n-i} \cdot (g_i + h_i) \right)^2 \tag{25}$$

Also, when the constraint length for expansion to the state of the Viterbi decoder is taken as K, the branch metric from the state $s_l$ to $s_m$ of the Viterbi decoder is determined by calculating the following equation (26):

$$\lambda_n(s_l, s_m) = \left( y2_n + \sum_{i=K+1}^{prd\_len+PR\_len} \hat{a}_{n-i}(s_l) \cdot g_i + \sum_{i=K+1}^{prd\_len+fbf\_len} \hat{a}_{n-i}(s_l) \cdot h_i + \sum_{i=0}^{K} a_{n-i} \cdot (g_i + h_i) \right)^2 \tag{26}$$

In this case, the number of states of the Viterbi decoder is 2^K.

Figure 15:
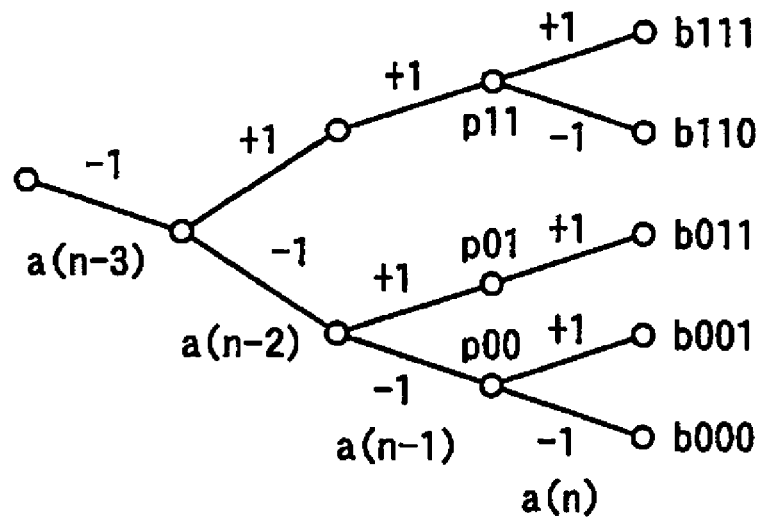
FIG. 15 shows a tree structure when previous data a(n−3) to an FDTS decoder shown in FIG. 2 is −1.
Figure 16:
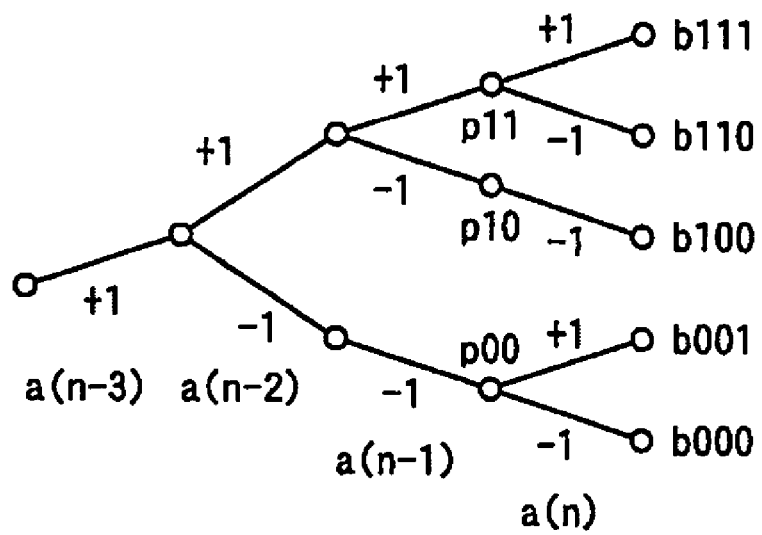
FIG. 16 shows a tree structure when previous data a(n−3) to the FDTS decoder shown in FIG. 2 is +1.

Here will be considered a system in which the sign of the minimum run length d=1 of a recording code is recorded. The "minimum run length" indicates a minimum number of successions of −1 or +1 in an NRZ recording code. That is, the code "d=1" means that −1 or +1 appears successively at least two times. FIG. 15 shows a tree structure of the FDTS decoder in which d=1, τ=2 and previous data on $a_{(n-3)}$ is −1. Also, a FDTS tree structure in which previous data on $a_{(n-3)}$ is +1 is shown in FIG. 16.

Note that the FDTS decoding is normally effected in a hardware in which τ=1 by way of example as described concerning a decoder disclosed in the Japanese Patent Application No. 2003-371112 of the Application of the present invention, for example. To show the common use of the metric calculation unit hardware by the Viterbi decoder and FDTS decoder, which is the feature of this embodiment, there will be described a decoding circuit in the Viterbi decoder which will be described in detail later.

A pass feedback type Viterbi decoder in which d=1 and K=2 (namely, the decoder is of a four-state type) will first be explained herebelow.

Figure 17:
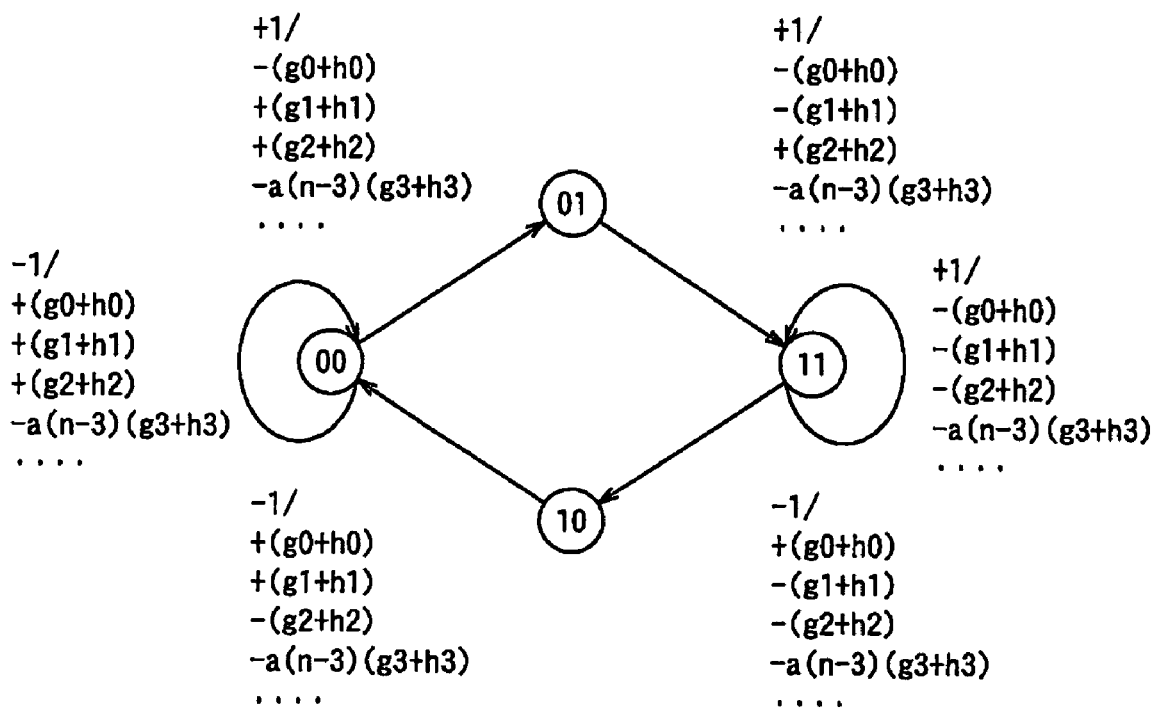
FIG. 17 explains the transition of the state of a Viterbi decoder shown in FIG. 2.

FIG. 17 explains the state transition of the Viterbi decoder. The state corresponds to $a_{(n-2)}a_{(n-1)}$. However, the sign 1 is indicated with "0". Previous data are $a_{(n-2)}$=−1 and $a_{(n-1)}$=+1, for example, indicate a state 01. In the line of the state transition, there is shown the relation between "input a(n)" and "output ISI".

Figure 18:
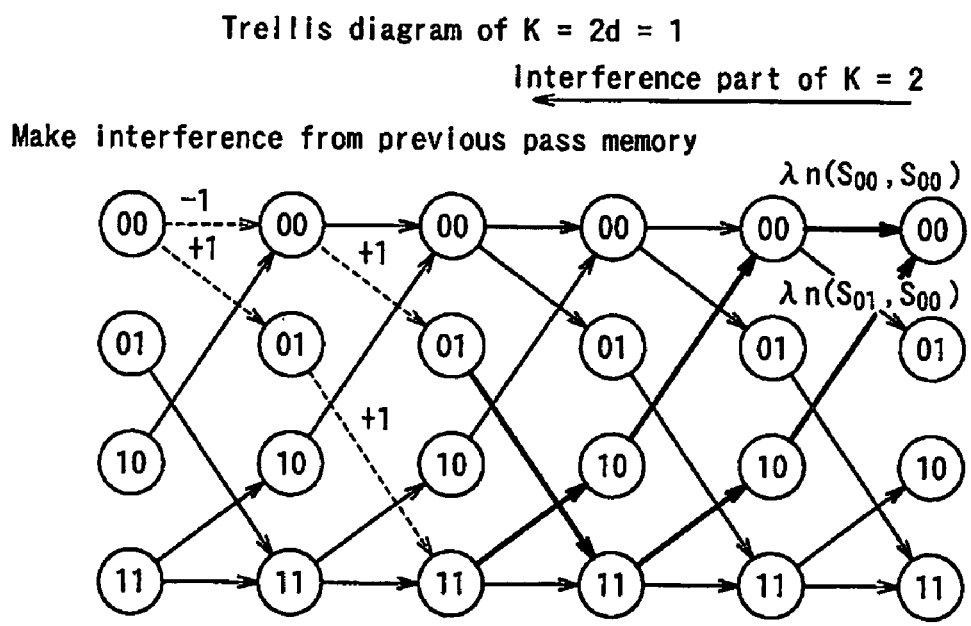
FIG. 18 shows a trellis diagram showing the state transition shown in FIG. 17.

Also, a trellis diagram of the state transition is as shown in FIG. 18. For example, since the branch metric of a state 00 includes transitions of s00→s00 and s10→s00, these two branch metrics will be calculated.

The prototypes of the pass feedback type Viterbi decoder include a two-state one disclosed in the non-patent document "Implementation of Two State Viterbi Decoder with Embedded Decision Feedback", for example. The Viterbi decoder in this embodiment has a similar configuration except that the state transition is limited taking the minimum run length in consideration and the metric calculation of the pass feedback configuration is effected using values gi and hi determined as will be described later, which is the feature of the present invention.

Figure 19:
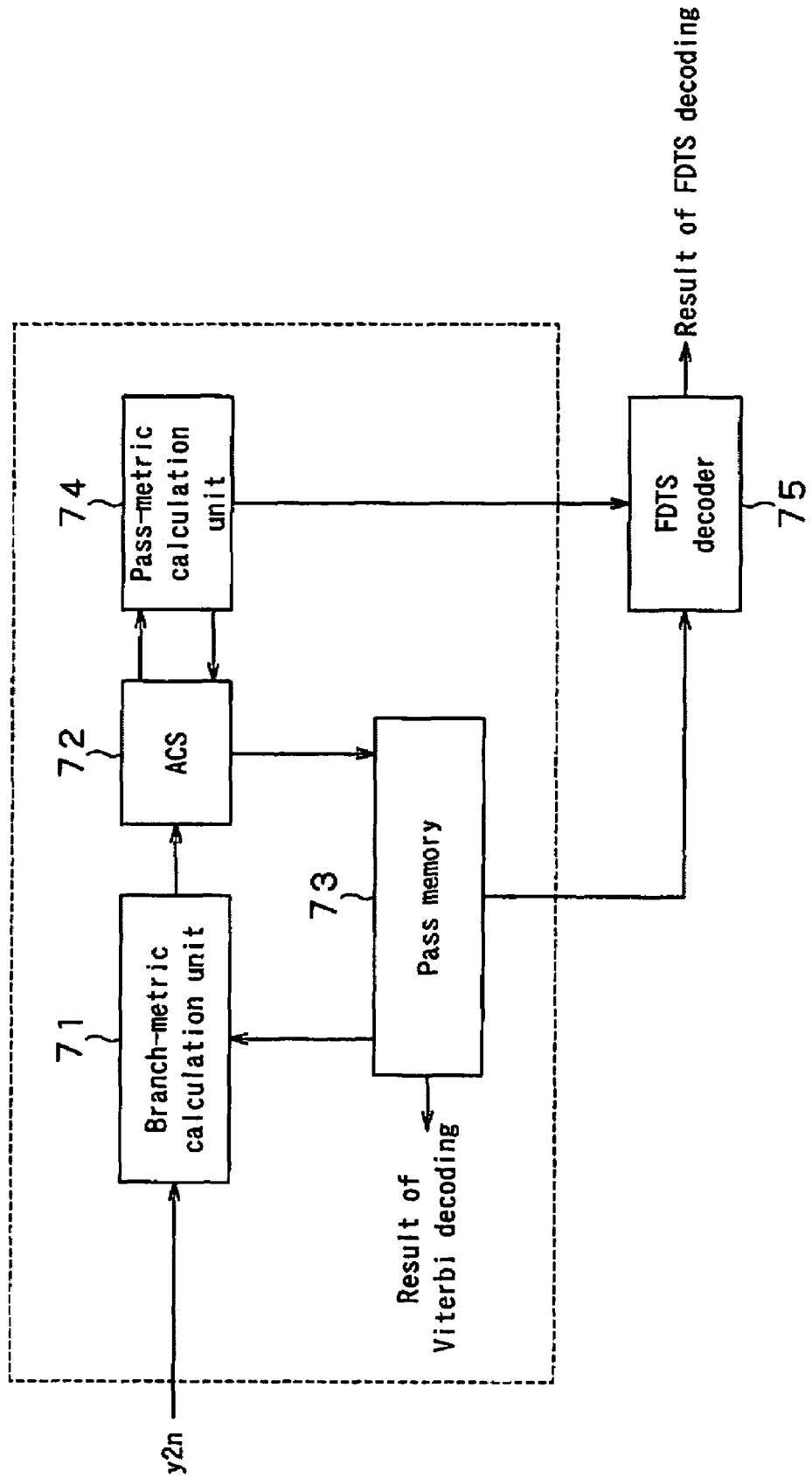
FIG. 19 is a block diagram showing the entire configuration of a pass feedback Viterbi decoder and FDTS decoder, which use their components in common, shown in FIG. 2.

FIG. 19 is a block diagram showing the entire configuration of the pass feedback Viterbi decoder 17 and FDTS decoder 18, which the feature of the present invention. As shown, each of the decoders includes a branch metric calculation unit 71, ACS (add compare select) unit 72, pass memory 73, pass metric calculation unit 74 and FDTS decoder 75.

Each of the branch metric calculation units 71, ACS unit 72 and pass memory 73 is provided in the same number as the state of Viterbi decoding. The pass metric calculation unit 74 functions to normalize as many pass metrics as states and determine the minimum state. Also, the FDTS decoder 75 functions to make FDTS calculation using a pass metric and branch metric, which is the feature of this embodiment.

Figure 20:
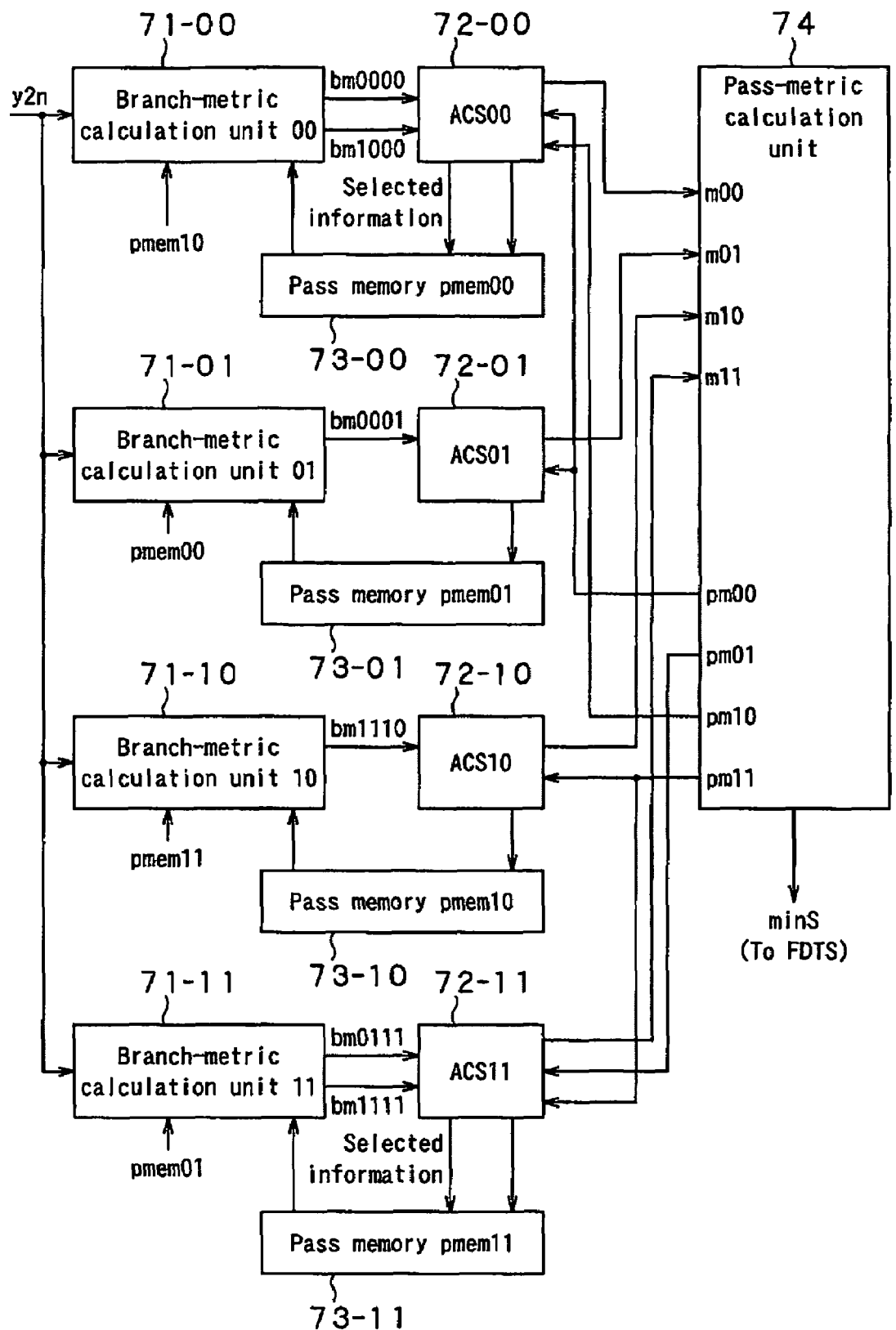
FIG. 20 is a block diagram showing, in detail, a Viterbi decoder shown in FIG. 19.

FIG. 20 shows, in detail, the Viterbi decoder which makes the state transitions shown in FIGS. 17 and 18.

As shown, the Viterbi decoder includes the branch metric calculation unit 71, ACS unit 72, pass memory 73 and pass metric calculation unit 74 as shown in FIG. 19.

Each of the pass memories 73 includes a shift register having pmem_len memories. The shift registers are arranged in an order from one having worked last to one having worked earliest. In the following description, the arrangement of the components of the Viterbi decoder is expressed with a reference numeral plus an integer subscript i (0 to pmem_len−1) like 73-00, for example.

First, a branch metric calculation unit 71-00 determines bm0000=λn(s00, s00) and bm1000=λn(s10, s00) using previous values in the pass memories pmem00 and pmem10, respectively. An ACS unit 72-00 compares values pm00+bm0000 and pm10+bm1000 as results of addition of a normalized pass metric and branch metric, respectively, with each other, selects a smaller one, and outputs it as m00. Also, the ACS unit 72-00 outputs +1 and information indicative of a selected branch to a pass memory pmem00[0].

Also, a branch metric calculation unit 71-01 determines bm0001=λn(s00, s01) using a previous value in a pass memory pmem00. An ACS unit 72-01 outputs a value pm00+bm0001 of addition of the normalized branch metric and branch metric as m01. Since the branch metric calculation unit 71-01 is supplied with only one information during this state, it will not make any comparison. Also, the branch metric calculation unit 71-01 outputs −1 to a pass memory 73-01 (pmem01[0]).

Also, a branch metric calculation unit 71-10 determines bm0010=λn(s11, s10) using a previous value in a pass memory pmem11. An ACS unit 72-10 outputs a value pm11+bm1110 of addition of the normalized branch metric and branch metric as m10. Since the branch metric calculation unit 71-10 is supplied with only one information during this state, it will not make any comparison. Also, the branch metric calculation unit 71-10 outputs −1 to a pass memory 73-10 (pmem10[0]).

A branch metric calculation unit 71-11 determines bm1111=λn(s11, s11) and bm0111=λn(s01, s11) using previous values in pass memories pmem11 and pmem01, respectively. An ACS unit 72-11 compares values pm11+bm1111 and pm01+bm0111 as results of addition of the normalized pass metric and branch metric, selects a smaller one and outputs it as m11. Also, the ACS unit 72-11 outputs +1 and information indicative of a selected branch to a pass memory 73-11 (pmem11[0]).

Then, the pass metric calculation unit finds a smallest one of supplied values m00, m01, m10 and m11, and normalizes it by the following calculation:

$pm00 = m00 - \min(m00, m01, m10, m11)$ $pm01 = m01 - \min(m00, m01, m10, m11)$ $pm10 = m10 - \min(m00, m01, m10, m11)$ $pm11 = m11 - \min(m00, m01, m10, m11)$ Also, the pass metric calculation unit will uses min_stat( ) as a function of finding a minimum state, and outputs minS.

minS=mi_stat(m00, m01, m10, m11)

where min_stat( ) is a function of outputting 00 when m00 is minimum, 01 when m01 is minimum, 10 when m10 is minimum and 11 when m11 is minimum.

Next, the pass memory pmem00 updates the following memory updating with information selected by the ACS unit 72-00.

When bm0000 is selected:

for(i=0; i<pmem_len−1; i++)pmem00[i+1]=pmem00[i]

When bm1000 is selected:

for(i=0; i<pmem_len−1; i++)pmem00[i+1]=pmem10[i]

Also, the pass memory pmem01 makes the following memory updating:

for(i=0; i<pmem_len−1; i++)pmem01[i+1]=pmem00[i]

Also, the pass memory pmem10 makes the following memory updating:

for(i=0; i<pmem_len−1; i++)pmem10[i+1]=pmem11[i]

Also, the pass memory pmem11 makes the following memory updating with ASCII selection information:

When bm0111 is selected:

for($i=0; i<$pmem\_len-1; i++)pmem11[$i+1$]=pmem01[$i$]

When bm1111 is selected:

for($i=0; i<$pmem\_len-1; i++)pmem11[$i+1$]=pmem11[$i$]

Figure 21:
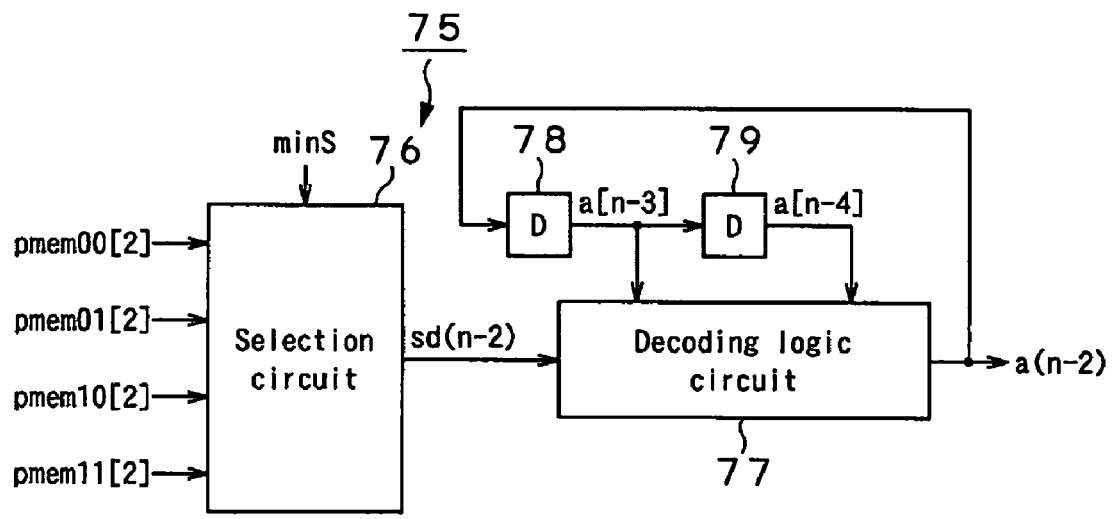
FIG. 21 shows the configuration of an FDTS decoder shown in FIG. 19.

FIG. 21 shows the FDTS decoder 75 in detail. As shown, the FDTS decoder 75 includes a decoding logic circuit 77 and delay units 78 and 79. The FDTS decoder 75 has such a configuration that makes FDTS decoding with $\tau=2$.

As shown, the FDTS decoder 75 also includes a selector 76 which make the following selections depending upon the value of minS:

minS=00:$sd(n-2)$=pmem00[2]

minS=01:$sd(n-2)$=pmem01[2]

minS=10:$sd(n-2)$=pmem10[2]

minS=11:$sd(n-2)$=pmem11[2]

Further, the FDTS decoder 75 makes the following decoding with the result of previous decision in order to keep a symbol dmin=1:

$a(n-4), a(n-3)=(-1,-1):a(n-2)=sd(n-2)$ $a(n-4)a(n-3)=(-1,+1):a(n-2)=+1$ $a(n-4)a(n-3)=(+1,-1):a(n-2)=-1$ $a(n-4)a(n-3)=(-1,-1):a(n-2)=sd(n-2)$

Namely, it suffices to make a decision on the basis of the prevision result of decision for the restriction imposed upon the delay of decision d.

Phase Shifter Etc.

Figure 22:
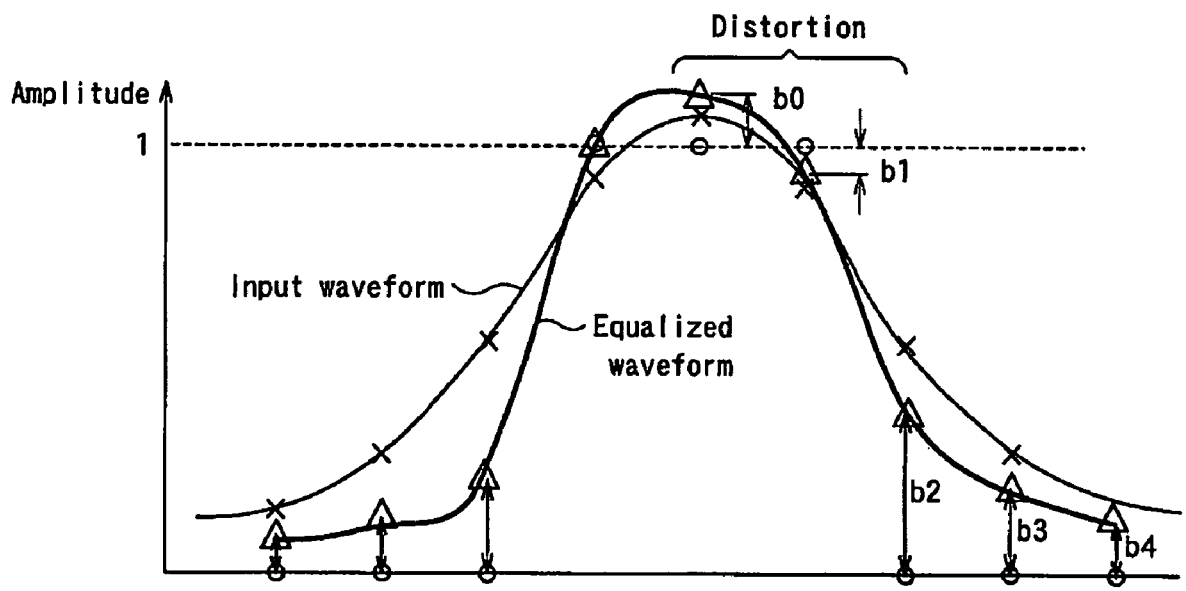
FIG. 22 shows another example of the input waveform to the FF filter shown in FIG. 2.

Here will be explained, with reference to FIG. 22, how to equalize an input signal to an equalized waveform including a relatively large leading edge ISI.

Figure 23:
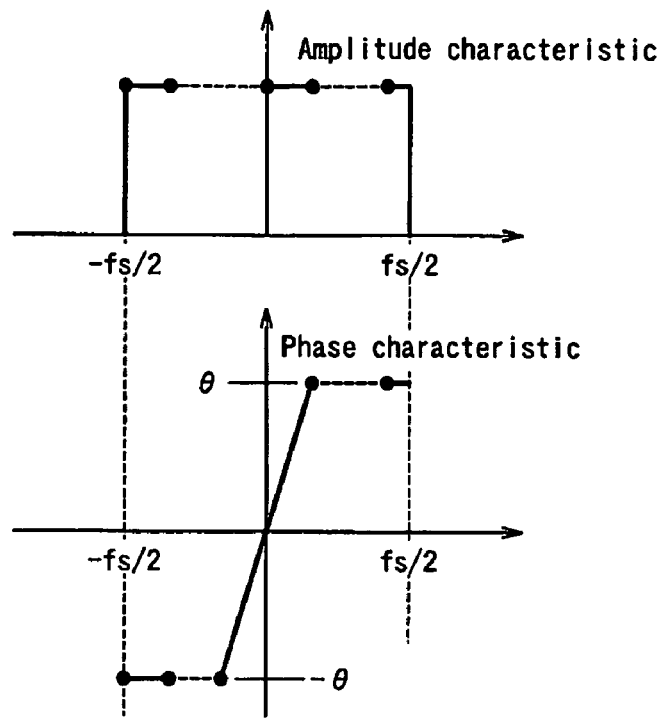
FIG. 23 shows a principle on which the phase of the equalized waveform shown in FIG. 22 is rotated.

First, an operation to rotate the phase of an equalized waveform including the leading ISI will be considered. The "rotating a phase $\theta$" means to match an amplitude characteristic with a phase characteristic along a frequency axis as shown in FIG. 23. It should be noted that "fs" in FIG. 23 indicates a sampling frequency.

FIR having a tap factor having the frequency characteristic shown in FIG. 23, subjected to inverse DFT (discrete Fourier transform), is defined as "phase shifter". It should be noted that the phase shifter can be a phase shifter disclosed in the Japanese Patent Application No. 2003-369312 of the Applicant of the present invention, for example, which can make a simple calculation requiring no inverse DFT for this purpose.

The phase shifter is to apply a steady phase characteristic to the inverse discrete Fourier transform expression to pre-formularize the relation between a tap factor and an angle of phase rotation $\theta$ and calculate the tap factor when determining a filter factor of the FIR filter. The tap factor calculation is such that a term of the angle of phase rotation $\theta$ and a term of summation of a value k of a trigonometric function of $2\pi kn/N$ (where $\pi$ is the circle ratio, N is a tap factor being an integer larger than 1, k and n are integers defined to be $0 \leq k \leq N-1$ and $0 \leq n \leq N-1$, respectively) are summed up, the term of summation is pre-calculated for each n and taken as a constant, and a trigonometric function of $\theta$ at that time is determined to determine the tap factor by a logical calculation.

Figure 24:
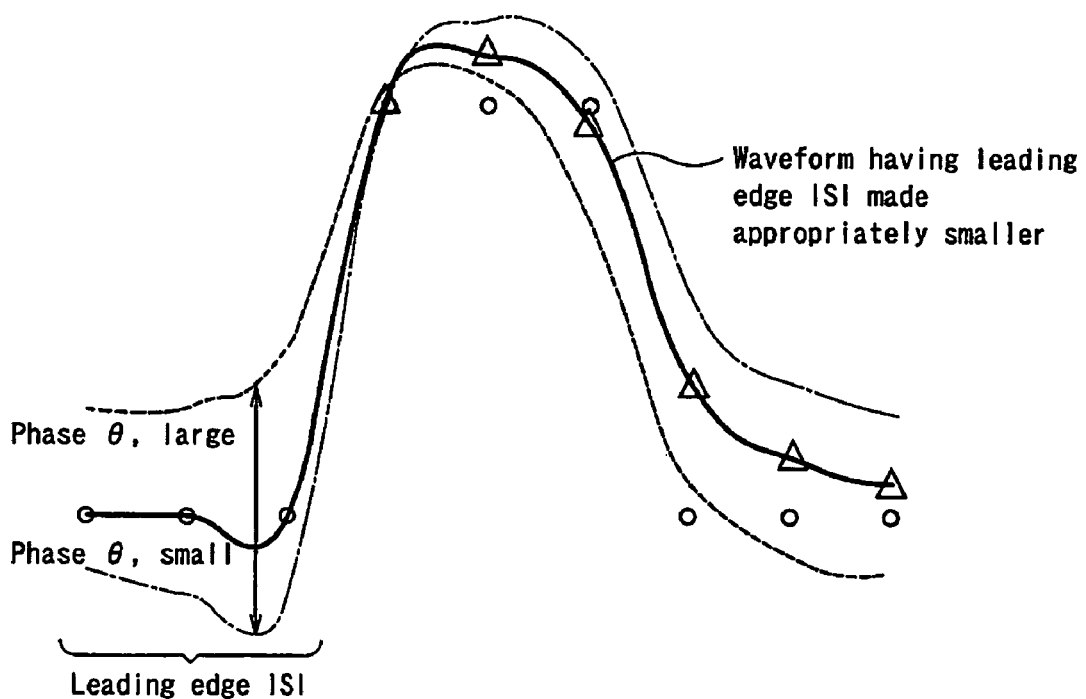
FIG. 24 shows the equalized waveform shown in FIG. 22 when having passed through the phase shifter.

FIG. 24 shows the equalized waveform having passed through the phase shifter.

It will be seen from FIG. 24 that with a larger phase $\theta$, the overshoot of the leading edge ISI will accordingly be larger while with a smaller phase $\theta$, the undershoot of the leading edge ISI will accordingly be larger. By feeding back the phase 74 by an automatic control so that the leading edge ISI will be smaller, it is possible to equalize the waveform for the leading ISI to have an appropriately smaller value.

The overshoot in FIG. 24 will appear as an interference with the leading edge ISI at a waveform detection point. When the phase $\theta$ is large as shown in FIG. 22, the error at the detection point will be larger in the positive-going direction, while with a smaller phase $\theta$, the error at the detection point will be larger in the negative-going direction. By calculating the following equation (31) on the basis of this fact, it is possible to calculate a phase shift amount proportional with the error of the phase $\theta$:

$$\{y5_{n-d-1} - PR(a_{n-d-1})\} \cdot PR(a_{n-d}) \qquad (31)$$

Figure 25:
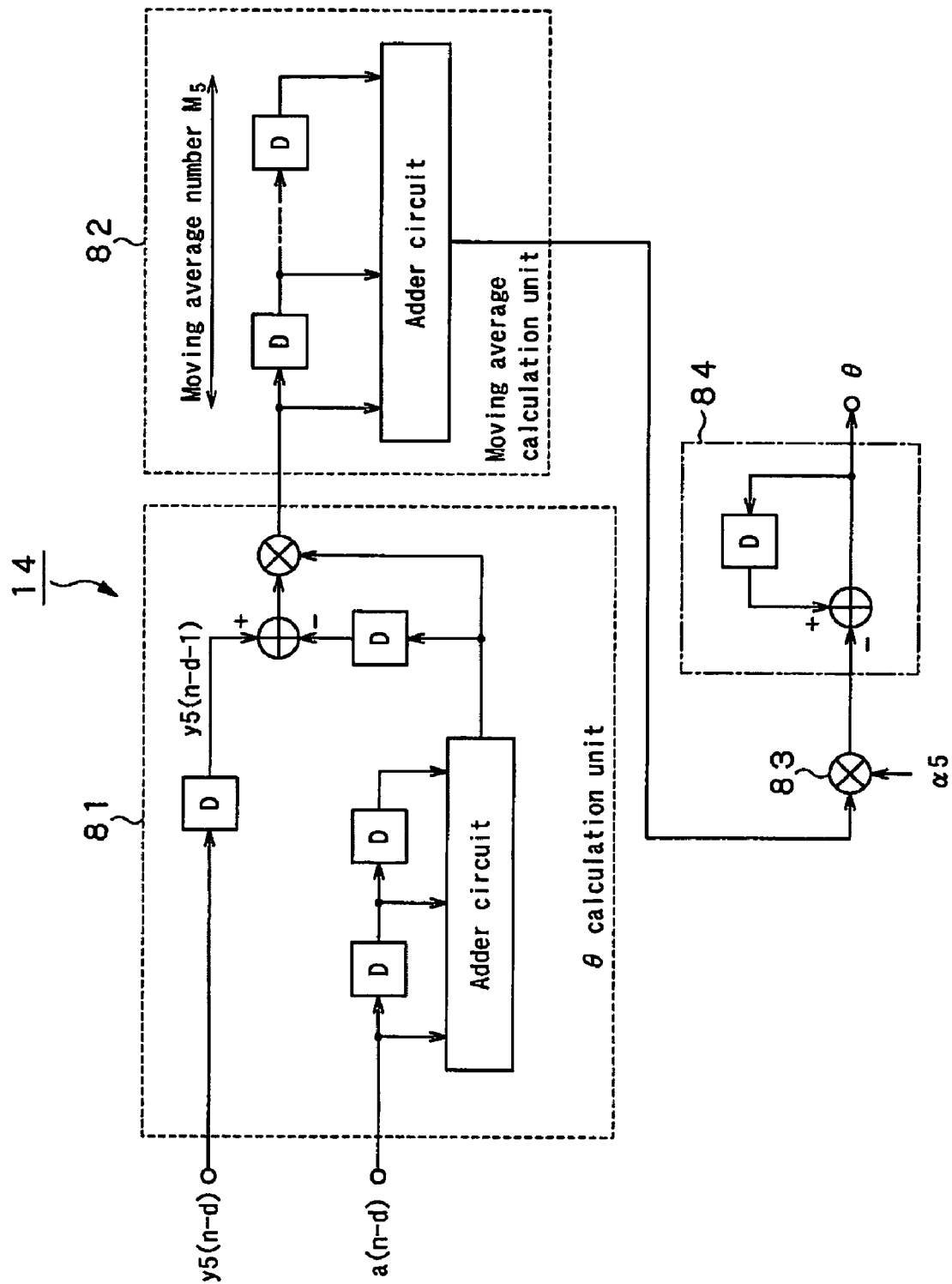
FIG. 25 shows a phase shifter factor control circuit shown in FIG. 2, which determines the phase of the phase shifter.

The phase shift factor control circuit 14 updates the phase $\theta$ on the basis of the phase shift amount. The phase shift factor control circuit 14 is shown in detail in FIG. 25. This phase shift factor control circuit 14 includes a phase ($\theta$) calculation unit 81 including an adder, delay unit, etc. to make the above calculation. The phase shift factor control circuit 25 also includes a moving average addition unit 82 including an adder, delay unit, etc. to make moving average within a range of M5 (moving average number), a multiplier 83 to multiply the result of moving average by an update factor $\alpha5$ and a subtracter 84 to subtract the result of multiplication from the phase $\theta$ one clock before.

Level Error/Timing Error Detection Circuit

Next, the level error/timing error detection circuit 30 will be explained.

The level error/timing error detection circuit 30 includes a level error detector 90 to detect a level error, and a timing error detector 100 to detect a timing error.

Figure 26:
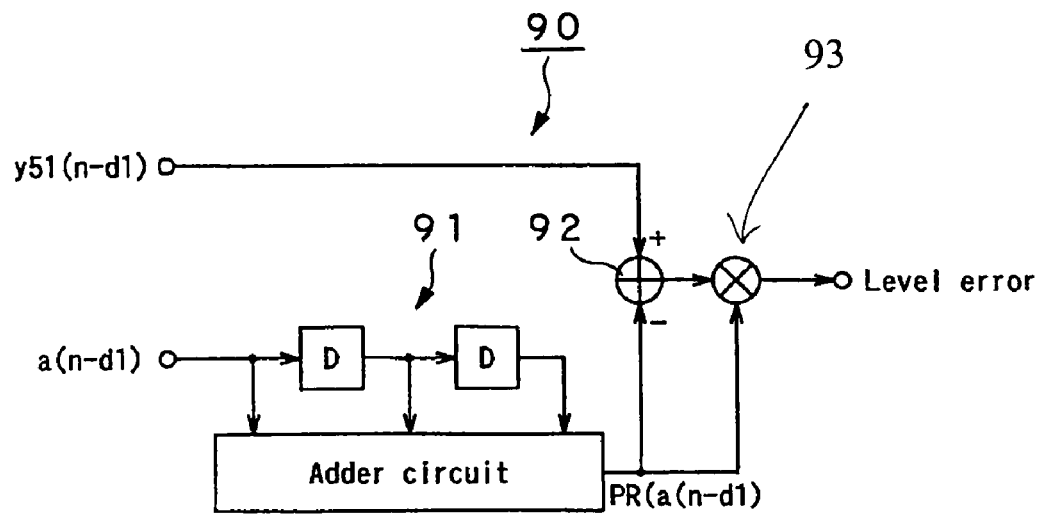
FIG. 26 is a block diagram of a level error detector in a level error/timing error detection circuit shown in FIG. 2.

FIG. 26 is a block diagram of the level error detector 90. As shown, the level error detector 90 is supplied with a result of decision a(n−d1) from the FDTS decoder 18 and a signal $y51_{(n-d1)}$ from the sector subtracter 27 (that is, waveform signal $y51_{(n-d1)}$ resulted from removal of a distortion and trailing edge ISI from the partial response from the FF filter 12).

As shown, the level error detector 90 includes a filter circuit 91 to calculate a reference waveform $PR(a_{(n-d)})$ of the partial response from the waveform signal $y51_{(n-d1)}$ resulted from removal of a distortion and trailing edge ISI response from the partial response from the result of decision $a_{(n-d)}$, a subtracter 92 to subtract the reference waveform $PR(a_{(n-d)})$ of the partial response from the waveform signal $y51_{(n-d1)}$ resulted from removal of a distortion and trailing edge ISI response from the partial response, and a multiplier 93 to multiply the result of subtraction from the subtracter 92 by the reference waveform $PR(a_{(n-d)})$ of the partial response.

The above level error detector 90 calculates a level error on the basis of the following equation (32):

$$\{y51_{n-d1} - PR(a_{n-d1})\} \cdot PR(a_{n-d1}) \qquad (32)$$

Figure 27:
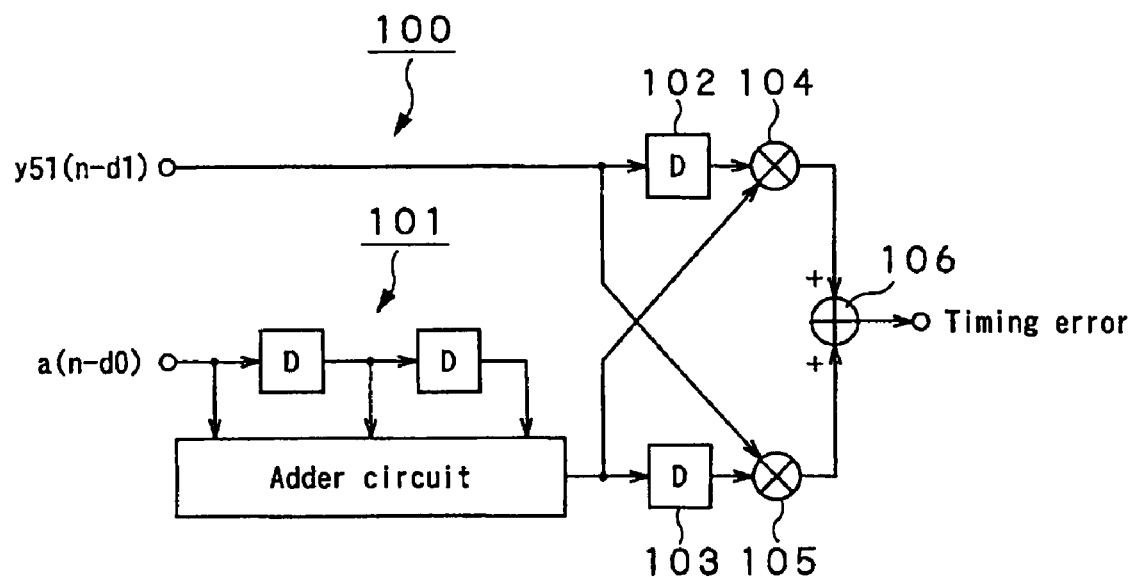
FIG. 27 is a block diagram of a timing error detector in a level error/timing error detection circuit shown in FIG. 2.

FIG. 27 is a block diagram of the timing error detector 100.

As shown, the timing error detector 100 is supplied with a result of decision $a_{(n-d1)}$ from the FDTS decoder 18 and a signal $y51_{(n-d1)}$ from the sector subtracter 27 (that is, waveform signal $y51_{(n-d1)}$ resulted from removal of a distortion and trailing edge ISI from the partial response from the FF filter 12).

As shown, the timing error detector 100 includes a filter circuit 101 to calculate the reference waveform $PR(a_{(n-d)})$ of the partial response from the result of decision a(n–d), a first delay unit 102 to delay, by one clock, the waveform signal $y51_{(n-d1)}$ resulted from removal of a distortion and trailing edge ISI response from the partial response, a second delay unit 103 to delay, by one clock, the reference waveform $PR(a_{(n-d)})$ of the partial response, a first multiplier 104 to multiply the removal waveform $y51_{(n-d-1)})$ of the partial response, delayed by one clock, by the reference waveform $PR(a_{(n-d)})$ of the partial response, a second multiplier 105 to multiply the reference waveform $PR(a_{(n-d-1)})$ of the partial response, delayed by one clock, by the removal waveform $y51_{(n-d1)}$, and an adder 106 to add together outputs from the first and second multipliers 104 and 105.

The above timing error detector 100 calculates a timing error on the basis of the following equation (33):

$$-y51_{n-d1} \cdot PR(a_{n-d1-1}) + y51_{n-d1-1} \cdot PR(a_{n-d1}) \tag{33}$$

Although the level error/timing error detection circuit 30 generates a level error and timing error on the basis of the output from the FDTS decoder 18 as above, it may generate such errors on the basis of an output from the Viterbi decoder 17. Since the FDTS decoder 18 is higher in speed of response than the Viterbi decoder 17, however, the Viterbi decoder 17 should desirably be used to acquire an error signal for detection of synchronization.

Effect of, and Results of Experiment on, the Adaptive Equalizer According to this Embodiment With the aforementioned adaptive equalizer 10, an input waveform can be decoded with minimizing the leading edge ISI as much as possible by reducing the asymmetry of the waveform and with reduction of the influence of distortion and trailing edge ISI by meeting the causality in the decoding method using the digital signal processing. Thus, the performance of the Viterbi decoding and that of FDTS decoding can be improved.

Also, the adaptive equalizer 10 can be used in combination with the predictor 13 to make a noise prediction type Viterbi decoding and a noise prediction type FDTS decoding while removing distortion and trailing ISI.

Also, using a removal waveform (namely, a waveform resulted from removal of a distortion and trailing edge ISI from a partial response), the adaptive equalizer 10 can make a more accurate adaptive decoding and level and timing error detection on the basis of a decision value from the FDTS decoder improved in performance of decision.

When an optical recording is made, output waveform will be distorted due to a skew of an optical disk, which will degrade the PLL (phase-locked loop) and decoding performance. To compensate such a distortion, the adaptive equalizer 10 can be applied for the purpose of equalization and error detection.

There will be described results of experiments done for compensating a tangential skew of a BD (blue-ray disk) which is a large-capacity optical disk using a blue laser.

Figure 28:
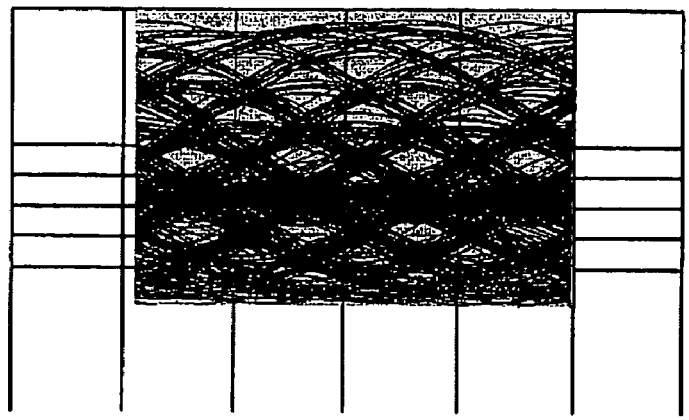
FIG. 28 is an eye diagram of an input signal to the FF filter shown in FIG. 2.
Figure 29:
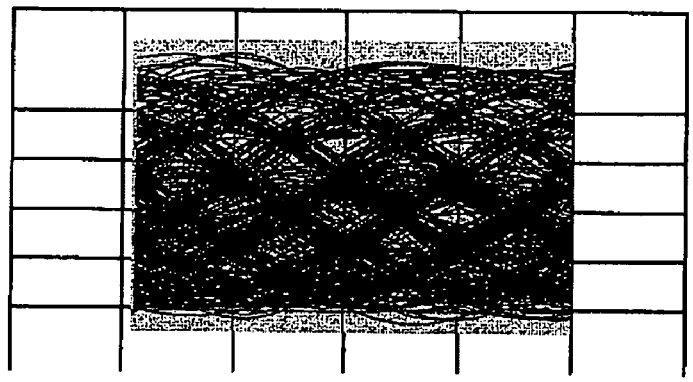
FIG. 29 is an eye diagram of an output signal from the FF filter shown in FIG. 2.
Figure 30:
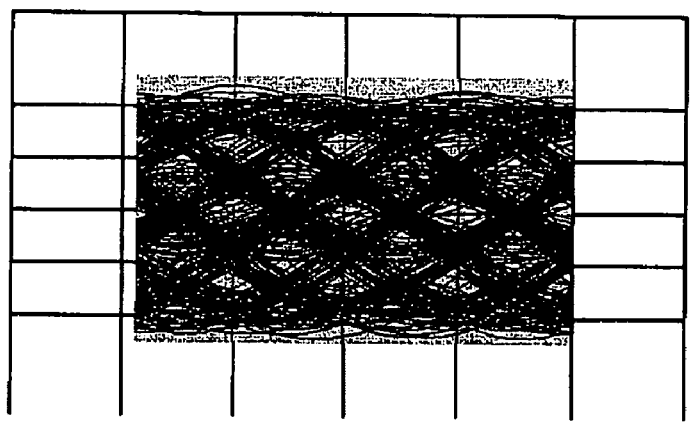
FIG. 30 is an eye diagram of the output signal from a FF filter when an input signal has been adaptively equalized by a combination of a secondary adaptive equalization Volterra filter used as the FF filter shown in FIG. 2 and a linear adaptive equalization filter connected in parallel with the secondary adaptive equalization Volterra filter.

FIGS. 28, 29 and 30 are eye diagrams of outputs from the FF filter 12 which was used in combination of an equalization intended for PR(111) with only the common linear equalization and a secondary Volterra filter, respectively, in playing a BD disk of a certain recording density.

In the experiments, the tangential skew was zero (0). FIG. 28 shows an eye diagram of an input digital signal supplied to the FF filter 12, and FIGS. 29 and 30 show eye diagrams of an output digital signal from the FF filter 12, resulted from interpolation between sampling points by the Sinc function. It should be noted that the target of the adaptive equalization of the FF filter 12 is PR(111).

More particularly, FIG. 28 shows an eye diagram of an output resulted from analog-digital conversion of a read signal from the BD disc, after appropriately equalized by an analog filter, and phase synchronization by a digital PLL provided in a digital unit, that is, an eye diagram of an input signal for the FF filter 12. Therefore, the waveform signal shown in FIG. 28 has not been adaptively equalized by the FF filter 12. The signal before adaptively equalized by the FF filter 12 as shown in this embodiment includes a remarkable vertical asymmetry.

Also, FIG. 29 shows an eye diagram of an output signal from the FF filter 12 when a linear adaptive equalization filter as the FF filter 12 has made an adaptive equalization of an input signal. From the eye diagram of the adaptively equalized signal as shown in FIG. 29, it will be seen that a nonlinear equalization error which not correctable by any conventional linear adaptive equalization filter remains in the output from the FF filter 12 using the linear adaptive equalization filter and the lower eye is smudged. That is, it will be known that the FF filter 12, if of any conventional type, is not able to eliminate the vertical asymmetry caused by the nonlinearity included in the input signal.

FIG. 30 is an eye diagram of the output signal from the FF filter 12 when an input signal has been adaptively equalized by a combination of a secondary adaptive equalization Volterra filter used as the FF filter 12 and a linear adaptive equalization filter connected in parallel with the Volterra filter. From the eye diagram of the output signal after adaptively equalized, shown in FIG. 29, it will be known that the vertical asymmetry has been considerably improved under the effect of the secondary adaptive equalization Volterra filter. Therefore, since the FF filter 12 incorporating the secondary adaptive equalization Volterra filter can supply an approximately linearized signal to any other signal processors, each of the latter will be able to perform nearly to the full extent.

Figure 31:
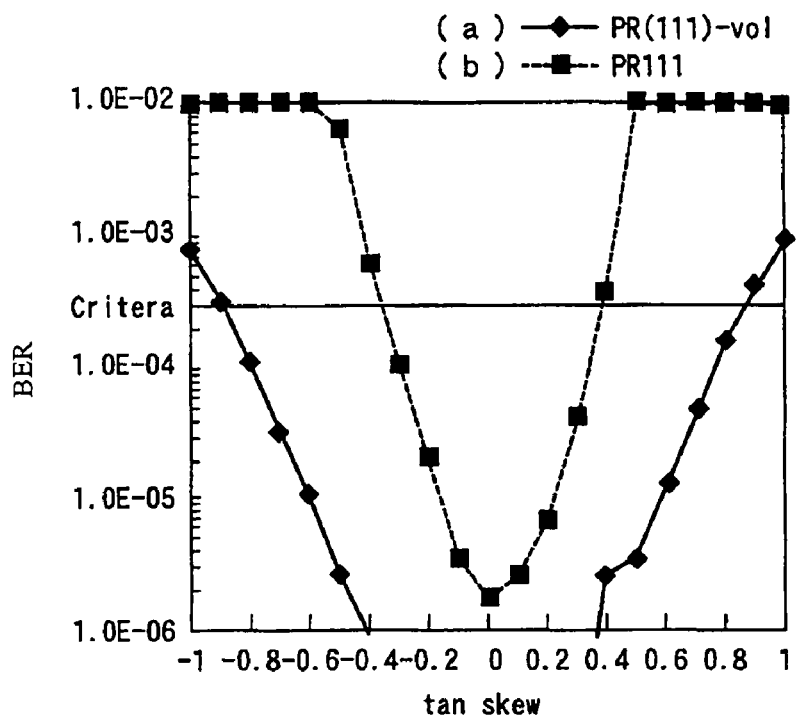
FIG. 31 shows the relation between a bit error rate and a tangential skew when a waveform is subjected to only the normal linear equalization and when the waveform is equalized by a combination of the normal linear equalizer and a secondary adaptive equalization Volterra filter, respectively, for a target of PR(111) in playing a BD (blue-ray disk) of a normal recording density.

FIG. 31 shows relations between an bit error rate (BER) vs. a tangential skew when a waveform is subjected to only the normal linear equalization and when the waveform is equalized by a combination of the normal linear equalizer and a secondary adaptive equalization Volterra filter, respectively, for a target of PR(111) in playing a BD (blue-ray disk) of a recording density. In FIG. 31, the dash line (a) indicates BER when an equalized waveform of linear PR(111) has been subjected to the Viterbi decoding, and the solid line (b) indicates BER when the waveform having equalized by the combination of the normal linear equalizer and secondary Volterra filter and further subjected to the Viterbi decoding. The "Criteria" in the drawing is the upper limit of BER at which the BD can operate normally as defined. As will be known by viewing the BER as the criterion, when the equalized waveform of linear PR(111) is decoded by the Viterbi decoder, the tangential skew margin is only about –0.3 deg. to +0.4 deg. but when the Viterbi decoding is done using the Volterra filter, the tangential skew margin can be about –0.9 deg. to +0.9 deg., which means that a two times or more larger tangential skew margin can be assured.

Figure 32:
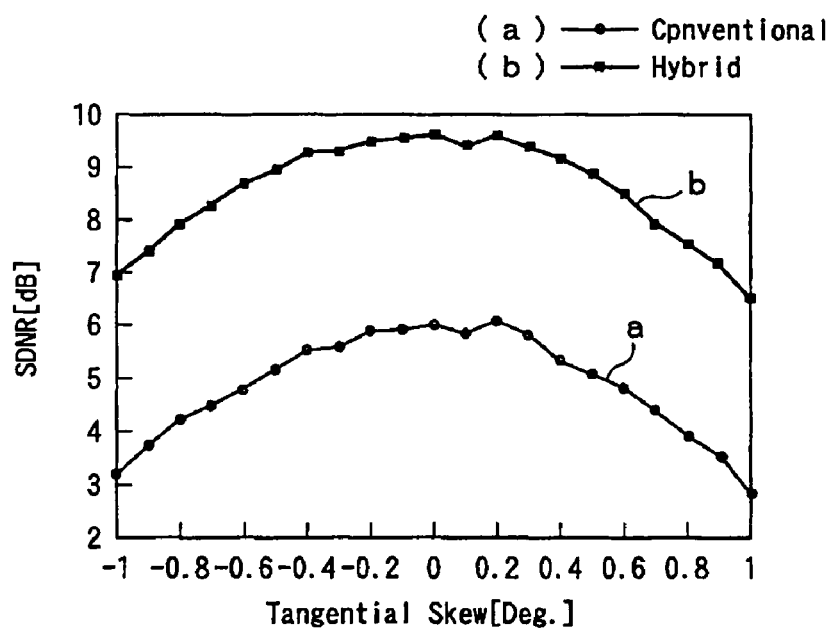
FIG. 32 shows the relation between the result of measurement of SDNR (signal to distortion and noise ratio) and a tangential skew at a detecting point after PR equalization.

FIG. 32 shows the relation between the results of measurement of SDNR (signal to distortion and noise ratio) and a tangential skew at a detecting point after PR equalization. The vertical axis indicates an SDNR while the horizontal axis indicates a tangential skew. SDNR indicates, in dB, a ratio of a deviation from a detection point of PR to be equalized with a level between the detection points. That is, a larger SDNR means that the adaptive equalizer has equalized a waveform with a better performance. It should be noted that the target of the equalization is PR(111).

The curve (a) with "Conventional" in FIG. 32 is a plotting of the result of equation by the conventional LMS algorithm using the aforementioned Volterra filter, and the curve (b) with "Hybrid" is a plotting of the result of composite adaptive equation using a Volterra filter as the FF filter 12 involved in the present invention. The curve (b) in FIG. 32 shows an improvement by about 4 dB over the measured tangential skew.

As above, detection of errors such as a phase error, level error, etc. on the basis of the result of equalization can be effected under a considerably reduced influence of distortion and trailing edge ISI.

Figure 33:
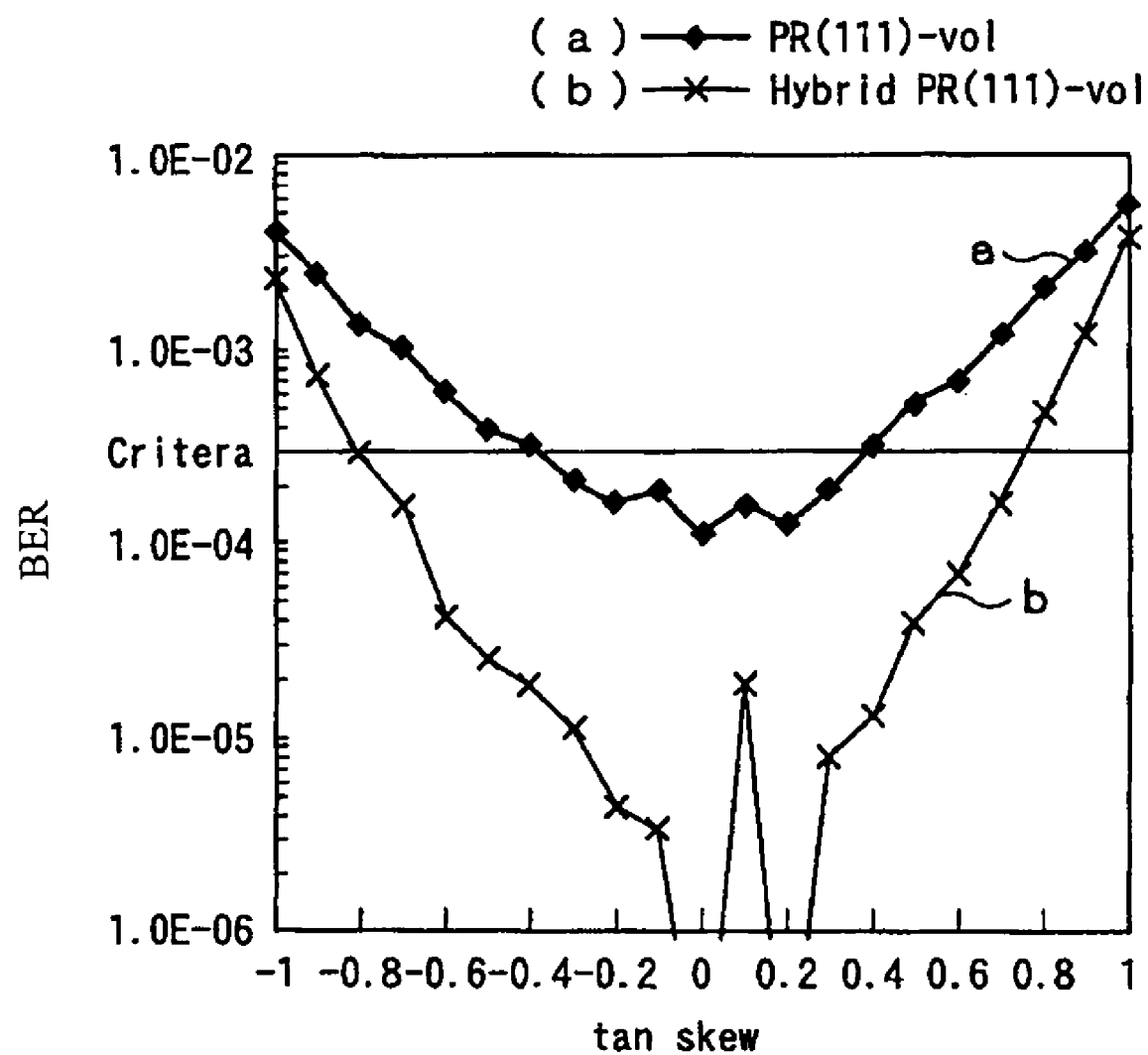
FIG. 33 shows the relation between the result of measurement of BER (bit error rate) and a tangential skew in the results of detection in FDTS and Viterbi decoding.

FIG. 33 shows the relation between the result of measurement of BER (bit error rate) and a tangential skew in results of detection in FDTS and Viterbi decoding. The vertical axis indicates BER while the horizontal axis indicates the tangential skew. Since the adaptive equalizer performs better with less errors, it will be seen from FIG. 33 that a higher performance of decoding can be attained with a lower BER.

The graph (a) with "PR(111)-vol" in FIG. 33 is a plotting of the result of an input waveform having been equalized by the conventional LMS algorithm using the Volterra filter and then decoded by the conventional Viterbi decoder. On the other hand, the curve (b) with "Hybrid PR(111)-vol" is a plotting of the result of an input waveform having subjected to the composite adaptive equalization using the Volterra filter as the FF filter 12 involved in the present invention and pass feedback type Viterbi decoding. As will be known from the curve (b), BER is improved due to the improved performance of decoding over the generally entire tangential skew. As will be understood by viewing the line through "Criteria" on the BER axis, the tangential skew margin is improved from a range of about −0.4 deg. to about +0.4 deg. to a range of about −0.8 deg. to about +0.8 deg.

As above, the margin in relation to the skew of optical-recording disk can be increased and the alignment to be made during production of a disk drive can be simplified. Thus, the disk drive can be produced with a reduced cost.

It should be understood by those skilled in the art that various modifications, combinations sub-combinations and alterations may occur depending on design requirements and other factors insofar as they are within the scope of the appended claims or the equivalents thereof.

What is claimed is:

1. An adaptive equalizing apparatus which makes partial response equalization and maximum-likelihood decoding of a read signal from a recording or transmission medium to generate a binary signal, the apparatus comprising:
    a feedforward nonlinear filter for filtering the read signal;
    a forward filter controlling means for controlling a tap factor of the feedforward filter;
    a first maximum-likelihood decoding means for performing maximum-likelihood decoding of the signal filtered by the feedforward filter to generate the binary signal;
    a second maximum-likelihood decoding means for performing maximum-likelihood decoding of the signal filtered by the feedforward filter to generate the binary signal;
    a first feedback filter for filtering the binary signal supplied from the first maximum-likelihood decoding means;
    a second feedback filter for filtering the binary signal supplied from the second maximum-likelihood decoding means;
    a first feedback filter controlling means for controlling a tap factor of the first feedback filter;
    a second feedback filter controlling means for controlling a tap factor of the second feedback filter;
    a first delaying means for delaying the signal filtered by the feedforward filter by a processing time of the first maximum-likelihood decoding means;
    a second delaying means for delaying the signal filtered by the feedforward filter by a processing time of the second maximum-likelihood decoding means;
    a first subtracting means for subtracting the signal supplied from the first feedback filter from the signal supplied from the first delaying means; and
    a second subtracting means for subtracting the signal supplied from the second feedback filter from the signal supplied from the second delaying means,
    said first feedback filter controlling means controlling the tap factor of the first feedback filter on the basis of the binary signal generated by the first maximum-likelihood decoding means to generate a distortion of a partial response after the leading edge of the binary signal and an ISI (inter-symbol interference) response after the trailing edge,
    said second feedback filter controlling means controlling the tap factor of the second feedback filter on the basis of the binary signal generated by the second maximum-likelihood decoding means to generate a distortion of a partial response after the leading edge of the binary signal and an ISI (inter-symbol interference) response after the trailing edge, and
    said feedforward filter controlling means controlling the tap factor of the feedforward filter for the signal supplied from one of the first or second subtracting means to be a partial response.

2. The apparatus according to claim 1, wherein the feedforward filter is a Volterra filter which makes nonlinear equalization of an input waveform on the presumption that the input waveform has been expanded into a Volterra series.

3. The apparatus according to claim 2, wherein the feedforward filter controlling means calculates the tap factor of the Volterra filter on the basis of the LMS (least means square) algorithm for the Volterra filter to have such a characteristic as to remove the ISI response before the leading edge.

4. The apparatus according to claim 3, wherein the feedforward filter controlling means calculates the tap factor of the Volterra filter by subtracting signals indicative of the distortion of the partial response after the leading edge and ISI response after the trailing edge from the binary signal generated by one of the first or second maximum-likelihood decoding means, multiplying the results of subtraction together and performing partial differentiation of the result of multiplication.

5. An adaptive equalizing method of generating a binary signal by performing partial response equalization and maximum-likelihood decoding of a read signal from a recording or transmission medium, the method comprising:
    filtering the read signal via a nonlinear feedforward filter;
    controlling a tap factor of the feedforward filter;
    performing first maximum-likelihood decoding of the signal filtered by the feedforward filter to generate a binary signal;
    performing second maximum-likelihood decoding of the signal filtered by the feedforward filter to generated a binary signal;
    filtering the binary signal supplied from the first maximum-likelihood decoding via a first feedback filter;

filtering the binary signal supplied from the second maximum-likelihood decoding via a second feedback filter;

controlling a tap factor of the first feedback filter;

controlling a tap factor of the second feedback filter;

delaying the signal filtered by the feedforward filter by a processing time of the first maximum-likelihood decoding, via a first delaying means;

delaying the signal filtered by the feedforward filter by a processing time of the second maximum-likelihood decoding, via a second delaying means;

subtracting, via a first subtracting means, the signal supplied from the first feedback filter from the signal supplied from the first delaying means; and subtracting, via a second subtracting means, the signal supplied from the second feedback filter from the signal supplied from the second delaying means;

controlling the tap factor of the first feedback filter on the basis of the binary signal generated by the first maximum-likelihood decoding to generate a distortion of a partial response after the leading edge of the binary signal and an ISI (inter-symbol interference) response after the trailing edge, controlling the tap factor of the second feedback filter on the basis of the binary signal generated by the second maximum-likelihood decoding to generate a distortion of a partial response after the leading edge of the binary signal and an ISI (inter-symbol interference) response after the trailing edge, controlling the tap factor of the feedforward filter for the signal supplied from one of the first or second subtracting means to a partial response.

6. The method according to claim 5, wherein the feedforward filter is a Volterra filter which makes nonlinear equalization of an input waveform on the presumption that the input waveform has been expanded into a Volterra series.

7. The method according to claim 6, wherein the tap factor of the Volterra filter is calculated on the basis of the LMS (least means square) algorithm to provide such a filter characteristic as to remove the distortion of partial response before the leading edge and ISI response before the leading edge.

8. The method according to claim 7, wherein the tap factor of the Volterra filter is calculated by subtracting signals indicative of the distortion of the partial response after the leading edge and ISI response after the trailing edge from the binary signal generated by one of the first or second maximum-likelihood decoding, multiplying the results of subtraction together and making partial differentiation of the result of multiplication.

9. An adaptive equalizing apparatus which makes partial response equalization and maximum-likelihood decoding of a read signal from a recording or transmission medium to generate a binary signal, the apparatus comprising:

a feedforward nonlinear filter configured to filter the read signal;

a forward filter control circuit configured to control a tap factor of the feedforward filter;

a first maximum-likelihood decoder configured to perform maximum-likelihood decoding of the signal filtered by the feedforward filter to generate the binary signal;

a second maximum-likelihood decoder configured to perform maximum-likelihood decoding of the signal filtered by the feedforward filter to generate the binary signal;

a first feedback filter configured to filter the binary signal supplied from the first maximum-likelihood decoder;

a second feedback filter configured to filter the binary signal supplied from the second maximum-likelihood decoder;

a first feedback filter control circuit configured to control a tap factor of the first feedback filter;

a second feedback filter control circuit configured to control a tap factor of the second feedback filter;

a first delay unit configured to delay the signal filtered by the feedforward filter by a processing time of the first maximum-likelihood decoder;

a second delay unit configured to delay the signal filtered by the feedforward filter by a processing time of the second maximum-likelihood decoder;

a first subtracter configured to subtract the signal supplied from the first feedback filter from the signal supplied from the first delay unit; and a second subtracter configured to subtract the signal supplied from the second feedback filter from the signal supplied from the second delay unit, wherein said first feedback filter control circuit controls the tap factor of the first feedback filter on the basis of the binary signal generated by the first maximum-likelihood decoding to generate a distortion of a partial response after the leading edge of the binary signal and an ISI (inter-symbol interference) response after the trailing edge, wherein said second feedback filter control circuit controls the tap factor of the second feedback filter on the basis of the binary signal generated by the second maximum-likelihood decoding to generate a distortion of a partial response after the leading edge of the binary signal and an ISI (inter-symbol interference) response after the trailing edge, and said feedforward filter control circuit controls the tap factor of the feedforward filter for the signal supplied from one of the first or second subtracter to be a partial response.

10. The adaptive equalizing apparatus of claim 9, wherein said first maximum-likelihood decoder is a Viterbi decoder and said second maximum-likelihood decoder is a Fixed Delay Tree Search (FDTS) decoder.

* * * * *